United States Patent
Jonsson et al.

(10) Patent No.: US 8,064,497 B2
(45) Date of Patent: Nov. 22, 2011

(54) SELECTING DELAY VALUES FOR A RAKE RECEIVER

(75) Inventors: Elias Jonsson, Malmö (SE); Mårten Myrehed, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 754 days.

(21) Appl. No.: 12/065,508

(22) PCT Filed: Aug. 31, 2006

(86) PCT No.: PCT/EP2006/008514
§ 371 (c)(1),
(2), (4) Date: Jul. 16, 2008

(87) PCT Pub. No.: WO2007/025749
PCT Pub. Date: Mar. 8, 2007

(65) Prior Publication Data
US 2009/0041163 A1   Feb. 12, 2009

Related U.S. Application Data

(60) Provisional application No. 60/719,037, filed on Sep. 21, 2005.

(30) Foreign Application Priority Data

Sep. 1, 2005   (EP) .................................... 05388069

(51) Int. Cl.
*H04B 1/00*   (2006.01)
(52) U.S. Cl. ........ 375/148; 375/136; 375/142; 375/144; 375/147; 375/150; 375/152
(58) Field of Classification Search .................. 375/148, 375/136, 142, 144, 147, 150, 152
See application file for complete search history.

(56) References Cited

U.S. PATENT DOCUMENTS
5,818,866 A  *  10/1998  Wilk ............................. 375/149
(Continued)

FOREIGN PATENT DOCUMENTS
EP          0 820 156 A2      1/1998
(Continued)

OTHER PUBLICATIONS

PCT International Search Report, mailed Mar. 6, 2007, in connection with International Application No. PCT/EP2006/008514.

(Continued)

*Primary Examiner* — Kabir A Timory
(74) *Attorney, Agent, or Firm* — Potomac Patent Group PLLC

(57) ABSTRACT

Multipath components of transmitted data symbols are received with individual delays and processed by a RAKE having a number of fingers. A delay profile indicating magnitudes for a first number of delay values is provided. Estimated magnitudes for a second number of delay values located between the first number of delay values are calculated by interpolation, and a combined delay profile is provided by combining the magnitudes for the first and second number of delay values. Delay values for peaks in the combined delay profile are determined, and a number of peak delay values ($P_1$, $P_2$, P) comprising the largest peak are selected from the combined delay profile. At least some of the selected peak delay values are provided to the RAKE and assigned to the fingers. This allows a reduction of current consumption and dye area, while still providing delay values with sufficient resolution for the RAKE.

26 Claims, 8 Drawing Sheets

U.S. PATENT DOCUMENTS

| | | | |
|---|---|---|---|
| 6,498,789 B1 * | 12/2002 | Honda | 370/342 |
| 6,731,622 B1 | 5/2004 | Frank et al. | |
| 2004/0047318 A1 | 3/2004 | Matsumoto | |
| 2005/0047485 A1 | 3/2005 | Khayrallah et al. | |
| 2006/0121945 A1 * | 6/2006 | Sarresh et al. | 455/561 |
| 2006/0268962 A1 * | 11/2006 | Cairns et al. | 375/148 |

FOREIGN PATENT DOCUMENTS

| | | |
|---|---|---|
| EP | 1 089 452 A1 | 4/2001 |
| WO | 2004/021716 A2 | 3/2004 |
| WO | 2004/034595 A2 | 4/2004 |
| WO | 2004/084562 A2 | 9/2004 |
| WO | 2004/107597 A1 | 12/2004 |

OTHER PUBLICATIONS

PCT Written Opinion, mailed Mar. 6, 2007, in connection with International Application No. PCT/EP2006/008514.

PCT International Preliminary Report on Patentability, issued Mar. 4, 2008, in connection with International Application No. PCT/EP2006/008514.

Partial European Search Report and Opinion dated Jan. 25, 2006, in connection with European Patent Application No. 05 38 8069.

Cozzo, C. et al.; "Rake receiver finger placement for realistic channels" 2004 Conference on Wireless Communications and Networking, 2004, IEEE Atlanta, GA, USA, Mar. 21-25, 2004, pp. 316-321, XP010708522.

* cited by examiner

SELECTING DELAY VALUES FOR A RAKE RECEIVER

CROSS-REFERENCE TO RELATED APPLICATIONS

This application claims priority under 35 U.S.C. §119 to European Patent Application No. 05388069.6, filed Sept. 1, 2005, which is hereby incorporated herein by reference in its entirety. This application also claims the benefit of U.S. Provisional Application No. 60/719,037, filed Sept. 21, 2005, which is hereby incorporated herein by reference in its entirety.

TECHNICAL FIELD OF THE INVENTION

The invention relates to a method of receiving digital data symbols from at least two transmitters through a transmission channel of a communications network, in which individual multipath components of a transmitted data symbol are received with individual delays, and wherein received signals are processed by a RAKE unit having a number of fingers, the method comprising the step of providing a delay profile for each transmitter from a set of received pilot signals; said delay profile being generated from the results of at least one path search and indicating a magnitude of received signal level for each of a first number of delay values. The invention further relates to a receiver for coded digital data symbols, and to a corresponding computer program and computer readable medium.

DESCRIPTION OF RELATED ART

In wireless communications systems the physical channel between a transmitter and a receiver is typically formed by a radio link. As an example, the transmitter could be a base station, and the receiver could be a mobile station, or vice versa. In most cases the transmit antenna is not narrowly focused towards the receiver. This means that the transmitted signals may propagate over multiple paths. In addition to a possible direct path from the transmitter to the receiver, many other propagation paths caused by reflections from objects in the surroundings exist. Thus, the receiver may receive multiple instances of the same signal at different times, i.e. with different delays, because different portions of the signal are reflected from various objects, such as buildings, moving vehicles or landscape details.

These different portions of the signal are a cause of interference in the receiver. Depending on the time resolution of the transmission system and the instantaneous phase relationship, portions with similar propagation distances combine at the receiver and form a distinct multipath component. The effect of the combining depends on the instantaneous relationship of the carrier wavelength and distance differences, and it may thus for a given multipath component be either enhancing or destructive. In case of destructive interference, the combining leads to significant decrease of the magnitude, or fading, of the path gain for that path. Thus the gain of a true path may temporarily decrease considerably due to fading.

Many transmission systems try to reduce the effect of multipath propagation and fading by using receivers that combine the data symbol energy from all multipath components. In Code Division Multiple Access (CDMA) and Wideband Code Division Multiple Access (WCDMA) systems the energy of the different received portions of the signal may be utilized in the receiver by using a so-called RAKE receiver.

In these systems spreading and despreading are used. Data are transmitted from the transmitter side using a spread spectrum modulation technique wherein the data are scattered across a wide range of frequencies. Each channel is assigned a unique spreading code that is used to spread the data across the frequency range. The spreading code is a pseudo-random noise code and is composed of e.g. a binary sequence of 1's and 0's, called "chips", which are distributed in a pseudo-random manner and have noise-like properties. The number of chips used to spread one data bit, i.e. chips/bit, may vary, and it depends, at least in part, on the data rate of the channel and the chip rate of the system. The duration of a chip is also used as a time unit in the receiver.

In the receiver the received signal must be despread and demodulated with the same spreading code using the same chip rate to recover the transmitted data. Furthermore, the timing of the demodulation must be synchronized, i.e. the despreading code must be applied to the received signal at the correct instant in time, which can be difficult due to the multipath effects mentioned above. The performance of a CDMA receiver is improved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate.

Thus the RAKE receiver requires knowledge of the multipath delays and the values of the channel impulse response for all paths. To achieve the best possible signal-to-noise ratio (SNR) at the output of the RAKE combiner, the signal energy from as many physical paths as possible should be collected. The changing delays of all known multipath components should be tracked, and new paths should be discovered quickly after they appear. This is typically achieved by using a path searcher unit with an observation window shorter than the full search area. In a practical delay estimation system the path searcher unit is used periodically to re-scan the delay range with the purpose of detecting new paths.

The performance of a CDMA receiver depends heavily on the quality of the multipath delay detection unit. If the detected delays of the multipaths are off the correct values, the transmitted power carried by the paths are at least partly lost and the noise levels will be increased so that the performance of the receiver will be degraded.

For a WCDMA system the detection of the multi-path delays is usually done as a two-stage process.

First, a wide search is a done to identify the location of the multi-path delays. The resolution of such a search, i.e. the distance between the delays, may typically be of the order of one chip or less, and the time delays are usually spaced equidistantly. The device doing such a search is here referred to as the path searcher, and the set of delays processed by the path searcher is referred to as the path searcher window. The number of time delays processed in the path searcher window may be approximately 60 to 150. Usually, the received power or signal to interference ratio (SIR) for a particular delay is used as a criterion for the quality of the delay. The resolution of the path searcher is typically lower than that required by the RAKE.

Next, a localized search is therefore performed over the selected regions of delays, where the number of time delays may be approximately 20 to 50. The resolution of this search is usually of the order of half a chip to an eighth of a chip. As previously the SIR or power is used as a quality measure. From the outcome of the localized search a decision is made to which delays to use for despreading the data in the RAKE.

When computing an entry in the delay profile, based on the power or SIR values, a despreader needs to be allocated. Very often the despreader operation is done in hardware. A set of despreaders describing a set of equi-spaced time delays, such as in the path searcher, consumes very often much less dye area, meaning among other things less current consumption, than if the time delays had no relationship with each other. Despreaders where the time delays are independent of each other are used in the localized searches. Roughly, the wide search and localized search consumes the same amount of dye area although there are many more despreaders in the wide search.

Thus this two stage solution with the considerable number of despreaders has a correspondingly high current consumption, and a large dye area is occupied by the despreaders. This is a disadvantage, because there is a continuing need to reduce the current consumption as well as the dye area of mobile terminals.

As an alternative to the two stage solution a wide search of high resolution could of course be conducted frequently to find the delays, but this solution would require an even larger dye area and have an even higher current consumption, and thus this is not a practical way of solving the problem.

US 2005/0047485 shows a method and an apparatus for finger placement in a RAKE receiver. The fingers in the RAKE receiver may be placed using a delay resolution that is independent from the delay resolution used to generate a multipath delay profile in e.g. a path searcher. Interpolation between measurement sample points in the delay profile may be used to determine point qualities of finger placement grid points that do not coincide with searcher measurements. When a mobile terminal receives transmissions from two or more transmitting antennas, the finger placement may be applied jointly at the receiver based on a union of the qualities from the different transmit signals, but scheduling of the corresponding path searcher runs is not mentioned.

Therefore, it is an object of the invention to provide a method of detecting multipath components from at least two transmitters, in which path searcher runs can be scheduled efficiently, and in which each transmitter is given an equal amount of measurement time over an extended period of time.

A further object of the invention is to provide a method of detecting multipath components, which allows a reduction of the current consumption and the dye area required for despreaders in the two stage solution, while at the same time providing delay values with sufficiently high resolution for the RAKE.

SUMMARY

According to the invention the object is achieved in that the method further comprises the steps of associating a counter with each of said transmitters; incrementing the counter associated with a given transmitter by one each time a frame of digital data symbols has been received from the given transmitter, until the counter reaches a maximum counter value; requesting a path search to be performed for the given transmitter, when the associated counter reaches a first pre-defined value; listing path search requests in a first-in-first-out queue; activating path searches in the order they are listed in the first-in-first-out queue; decreasing the counter associated with a transmitter by a second pre-defined value when a path search for that transmitter is activated. In this way an efficient way of scheduling the path searcher runs is achieved, while ensuring that over an extended period of time all transmitters to be measured on have been given an equal amount of measurement time.

The method may further comprise the steps of calculating by interpolation estimated magnitudes of received signal level for a second number of delay values located between at least some of said first number of delay values; providing a combined delay profile by combining the magnitudes of received signal level for said first number of delay values and said second number of delay values; determining delay values for peaks detected in said combined delay profile, selecting a number of peak delay values among the peak delay values determined for said combined delay profile, said selected peak delay values comprising at least the delay value representing the largest peak detected in said combined delay profile; and providing at least some of the selected peak delay values to the RAKE unit and assigning each provided peak delay value to a finger of the RAKE unit.

By using interpolation for estimating intermediate signal levels, a resolution that is sufficient for the RAKE can be achieved from the wide path search in a relatively simple way without increasing the current consumption or the dye area required for despreaders. Thus this method only relies upon the wide search for finding and monitoring the propagation channel time delays and selecting the time delays for despreading data in the RAKE.

In one embodiment at least some of said first number of delay values are equidistantly spaced, and in that case each of said second number of delay values may be located half-way between two neighbouring ones of said first number of delay values.

The step of calculating estimated magnitudes for said second number of delay values may be performed using polynomial interpolation.

In one embodiment, the step of selecting a number of peak delay values comprises the steps of selecting the delay value representing the largest peak detected in said combined delay profile; removing from consideration all delay values within a distance strictly less than a pre-defined minimal spacing of the delay value just selected; and repeatedly selecting the delay value representing the largest peak detected among the remaining delay values and removing from consideration all delay values within a distance strictly less than a pre-defined minimal spacing of the delay value just selected, until a given number of delay values have been selected or all delay values of the combined delay profile have been selected or removed from consideration. In this way delay values associated with weak power values can be removed and a subset of the delay values corresponding to the strongest power values selected for use in the RAKE, such that a given minimal spacing exists between the delay values.

In an alternative embodiment, the step of selecting a number of peak delay values comprises the steps of pre-selecting all delay values of said combined delay profile representing magnitudes of received signal level higher than a pre-defined threshold; selecting the delay value representing the largest peak among said pre-selected delay values; removing from consideration the delay value just selected and delay values within a distance strictly less than two times a predefined minimal spacing of the delay value just selected, except for the delay values located said predefined minimal spacing from the delay value just selected; repeatedly selecting, if a delay value located said predefined minimal spacing from the delay value previously selected belongs to said pre-selected delay values, this value and removing from consideration the delay value just selected and delay values within a distance strictly less than two times a predefined minimal spacing of the delay value just selected, except for the delay values located said predefined minimal spacing from the delay value just selected; and repeating these steps for the remaining pre-selected delay values, until a given number of delay values have been selected or all pre-selected delay values have been selected or removed from consideration. Also in this embodiment delay values associated with weak power values can be removed and a subset of the delay values corresponding to the strongest power values selected for use in the RAKE, such that a given minimal spacing exists between the delay values. This embodiment further tries to space the selected delay values as uniformly as possible.

The method may further comprise the steps of generating from the peak delay values selected for each transmitter a combined set of peak delay values; generating a reduced set of peak delay values by choosing a number of the largest peak delay values from the combined set of peak delay values; generating a modified set of peak delay values by replacing, if no peak delay values from a given transmitter is contained in said reduced set of peak delay values and at least one peak delay value from said given transmitter represents a peak higher than a pre-defined threshold, the peak delay value of the weakest peak from said reduced set of peak delay values by the peak delay value of the largest peak from said given transmitter; and providing the modified set of peak delay values to the RAKE unit and assigning each peak delay value of the modified set to a finger of the RAKE unit. In this way the receiver is able to utilize information from more than one transmitter or cell. Since different transmitters are completely uncorrelated, the contribution from different transmitters is valuable.

Further, an activated path search for a transmitter may provide a new search delay profile for that transmitter, and in that case the method may further comprise the steps of extracting the delay values of a number of the largest peaks and their closest neighbour delay values of said new search delay profile for a transmitter; and updating a previous delay profile provided for that transmitter by calculating for each delay value represented in the previous delay profile as well as in the extracted delay values an updated magnitude of received signal level for that delay value by adding to the previously calculated magnitude a percentage of the difference between the previously calculated magnitude and the corresponding magnitude from the new search delay profile, thereby obtaining an updated delay profile. By updating the previous delay profile in view of the new search delay profile instead of just using the new search delay profile, it is ensured that short noise peaks do not change the profile too much.

When the percentage depends on the magnitude from the new search delay profile compared to the previously calculated magnitude, it can be obtained that there is a bias in keeping a delay if it is represented as a high peak in the previous delay profile, while a new high peak in the new search delay profile is also taken into consideration.

The method may further comprise the steps of selecting the delay value representing the largest peak detected in said updated delay profile; removing from consideration all delay values within a distance strictly less than a pre-defined minimal spacing of the delay value just selected; repeatedly selecting the delay value representing the largest peak detected among the remaining delay values and removing from consideration all delay values within a distance strictly less than a pre-defined minimal spacing of the delay value just selected, until a given number of delay values have been selected or all delay values of the updated delay profile have been selected or removed from consideration, and providing a monitored delay profile comprising the selected delay values and their closest neighbour delay values from said updated delay profile. In this way delay values associated with weak power values in the updated delay profile can be removed and a subset of the delay values corresponding to the strongest power values selected as a monitored delay profile, such that a given minimal spacing exists between the delay values.

When the method further comprises the step of performing each time a pre-defined number of frames of digital data symbols have been received the steps of providing a combined delay profile and selecting a number of peak delay values among the peaks of the combined delay profile, wherein the monitored delay profile is used as the delay profile provided for a transmitter, it is ensured that new delay values based on the monitored delay profile can be provided to the RAKE with well defined intervals.

As mentioned, the invention also relates to a receiver for digital data symbols from at least two transmitters through a transmission channel of a communications network, in which individual multipath components of a transmitted data symbol are received with individual delays, the receiver comprising a RAKE unit having a number of fingers for processing received signals, and the receiver being arranged to provide a delay profile for each transmitter from a set of received pilot signals; said delay profile being generated from the results of at least one path search and indicating a magnitude of received signal level for each of a first number of delay values.

When the receiver is arranged to generate the delay profile provided for a transmitter from the results of at least one path search, and the receiver is further arranged to associate a counter with each of said transmitters; increment the counter associated with a given transmitter by one each time a frame of digital data symbols has been received from the given transmitter, until the counter reaches a maximum counter value; request a path search to be performed for the given transmitter, when the associated counter reaches a first pre-defined value; list path search requests in a first-in-first-out queue; activate path searches in the order they are listed in the first-in-first-out queue; decrease the counter associated with a transmitter by a second pre-defined value when a path search for that transmitter is activated, an efficient way of scheduling the path searcher runs is achieved, while ensuring that over an extended period of time all transmitters to be measured on have been given an equal amount of measurement time.

The receiver may further be arranged to calculate by interpolation estimated magnitudes of received signal level for a second number of delay values located between at least some of said first number of delay values; provide a combined delay profile by combining the magnitudes of received signal level for said first number of delay values and said second number of delay values; determine delay values for peaks detected in said combined delay profile, select a number of peak delay values among the peak delay values determined for said combined delay profile, said selected peak delay values comprising at least the delay value representing the largest peak detected in said combined delay profile; and provide at least some of the selected peak delay values to the RAKE unit and assign each provided peak delay value to a finger of the RAKE unit. In this way a receiver for detecting multipath components is achieved, which allows a reduction of the current consumption and the dye area required for despreaders in a two stage solution, while at the same time providing delay values with sufficiently high resolution for the RAKE.

In one embodiment, the receiver is arranged to provide the delay profile for a transmitter such that at least some of said first number of delay values are equidistantly spaced, and in that case the receiver may be arranged to locate each of said second number of delay values half-way between two neighbouring ones of said first number of delay values.

The receiver may be arranged to calculate estimated magnitudes for said second number of delay values by using polynomial interpolation.

In one embodiment, the receiver is arranged to select a number of peak delay values by selecting the delay value representing the largest peak detected in said combined delay profile; removing from consideration all delay values within a distance strictly less than a pre-defined minimal spacing of the delay value just selected; and repeatedly selecting the delay value representing the largest peak detected among the remaining delay values and removing from consideration all delay values within a distance strictly less than a pre-defined minimal spacing of the delay value just selected, until a given number of delay values have been selected or all delay values of the combined delay profile have been selected or removed from consideration. In this way delay values associated with weak power values can be removed and a subset of the delay values corresponding to the strongest power values selected for use in the RAKE, such that a given minimal spacing exists between the delay values.

In an alternative embodiment, the receiver is arranged to select a number of peak delay values by pre-selecting all delay values of said combined delay profile representing magnitudes of received signal level higher than a pre-defined threshold; selecting the delay value representing the largest peak among said pre-selected delay values; removing from consideration the delay value just selected and delay values within a distance strictly less than two times a predefined minimal spacing of the delay value just selected, except for the delay values located said predefined minimal spacing from the delay value just selected; repeatedly selecting, if a delay value located said predefined minimal spacing from the delay value previously selected belongs to said pre-selected delay values, this value and removing from consideration the delay value just selected and delay values within a distance strictly less than two times a predefined minimal spacing of the delay value just selected, except for the delay values located said predefined minimal spacing from the delay value just selected; and repeating these steps for the remaining pre-selected delay values, until a given number of delay values have been selected or all pre-selected delay values have been selected or removed from consideration. Also in this embodiment delay values associated with weak power values can be removed and a subset of the delay values corresponding to the strongest power values selected for use in the RAKE, such that a given minimal spacing exists between the delay values. This embodiment further tries to space the selected delay values as uniformly as possible.

The receiver may further be arranged to generate from the peak delay values selected for each transmitter a combined set of peak delay values; generate a reduced set of peak delay values by choosing a number of the largest peak delay values from the combined set of peak delay values; generate a modified set of peak delay values by replacing, if no peak delay values from a given transmitter is contained in said reduced set of peak delay values and at least one peak delay value from said given transmitter represents a peak higher than a pre-defined threshold, the peak delay value of the weakest peak from said reduced set of peak delay values by the peak delay value of the largest peak from said given transmitter; and provide the modified set of peak delay values to the RAKE unit and assign each peak delay value of the modified set to a finger of the RAKE unit. In this way the receiver is able to utilize information from more than one transmitter or cell. Since different transmitters are completely uncorrelated, the contribution from different transmitters is valuable.

Further, the receiver may be arranged to provide in response to an activated path search for a transmitter a new search delay profile for that transmitter, and in that case the receiver may further be arranged to extract the delay values of a number of the largest peaks and their closest neighbour delay values of said new search delay profile for a transmitter; and update a previous delay profile provided for that transmitter by calculating for each delay value represented in the previous delay profile as well as in the extracted delay values an updated magnitude of received signal level for that delay value by adding to the previously calculated magnitude a percentage of the difference between the previously calculated magnitude and the corresponding magnitude from the new search delay profile, thereby obtaining an updated delay profile. By updating the previous delay profile in view of the new search delay profile instead of just using the new search delay profile, it is ensured that short noise peaks do not change the profile too much.

When the percentage depends on the magnitude from the new search delay profile compared to the previously calculated magnitude, it can be obtained that there is a bias in keeping a delay if it is represented as a high peak in the previous delay profile, while a new high peak in the new search delay profile is also taken into consideration.

The receiver may further be arranged to select the delay value representing the largest peak detected in said updated delay profile; remove from consideration all delay values within a distance strictly less than a pre-defined minimal spacing of the delay value just selected; repeatedly select the delay value representing the largest peak detected among the remaining delay values and remove from consideration all delay values within a distance strictly less than a pre-defined minimal spacing of the delay value just selected, until a given number of delay values have been selected or all delay values of the updated delay profile have been selected or removed from consideration, and provide a monitored delay profile comprising the selected delay values and their closest neighbour delay values from said updated delay profile. In this way delay values associated with weak power values in the updated delay profile can be removed and a subset of the delay values corresponding to the strongest power values selected as a monitored delay profile, such that a given minimal spacing exists between the delay values.

When the receiver is further arranged to provide a combined delay profile and select a number of peak delay values among the peaks of the combined delay profile each time a pre-defined number of frames of digital data symbols have been received, and use the monitored delay profile as the delay profile provided for a transmitter, it is ensured that new delay values based on the monitored delay profile can be provided to the RAKE with well defined intervals.

In some embodiments, the receiver may be a WCDMA receiver.

The invention also relates to a computer program and a computer readable medium with program code means for performing the method described above.

BRIEF DESCRIPTION OF THE DRAWINGS

The invention will now be described more fully below with reference to the drawings, in which.

DETAILED DESCRIPTION OF EMBODIMENTS

Figure 1:
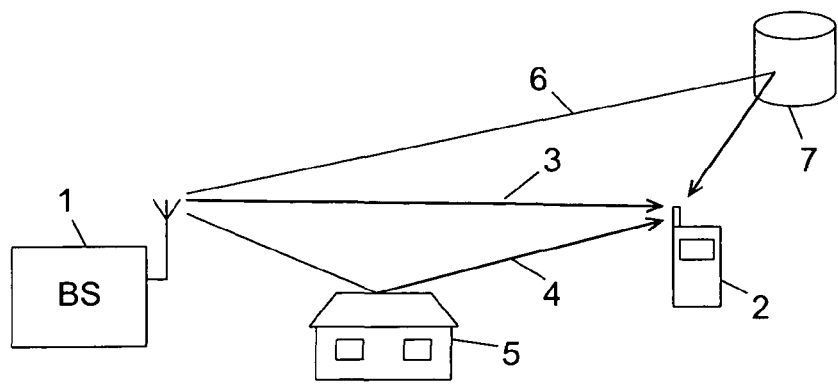
FIG. 1 shows an example of multiple paths between a base station and a mobile station.

FIG. 1 shows a situation in which a base station 1 and a mobile station 2 of a wireless communications system communicate with each other. As an example, a signal transmitted from the base station 1 is received by the mobile station 2. However, the transmitted signal travels along multiple paths from the base station to the mobile station. In this case there is a direct and unobstructed propagation path 3, but in addition to this direct path, reflections from objects in the surroundings cause a number of indirect paths to exist. Two such paths are shown in the figure. One indirect path 4 is reflected from a house 5, while another path 6 is caused by reflection from another building 7.

Since the part of a signal transmitted via one of the indirect paths 4 and 6 has to travel a longer distance to arrive at the mobile station 2, compared to the part of the signal travelling via the direct path 3, multiple instances of the same signal will be received by the mobile station 2 at different times, i.e. with different time delays.

Figure 2:
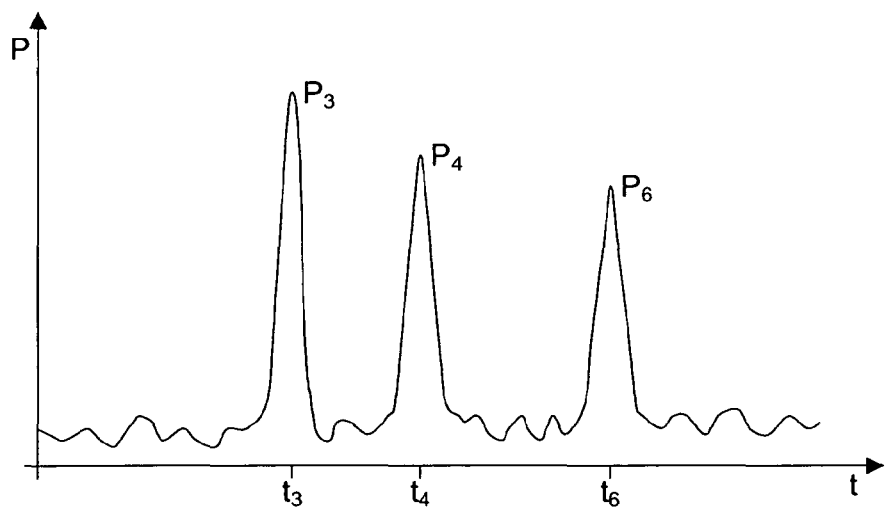
FIG. 2 shows a power delay profile for the paths illustrated in FIG. 1.

Thus, if a pilot signal is transmitted from the base station 1, the power P received at the mobile station 2 as a function of the time t may look as illustrated in FIG. 2, which shows an example of a power delay profile. The power delay profile shows all signals received at the mobile station, including noise and interference signals. However, only the peaks in the power delay profile correspond to the multipath components of the transmitted signal. Together these peaks form the impulse response of the channel. In FIG. 2 the peak $P_3$ received at the time $t_3$ corresponds to the direct path 3 in FIG. 1, while the peaks $P_4$ and $P_6$ received at the times 4 and $t_6$, respectively, correspond to the indirect paths 4 and 6 in FIG. 1. Thus, as an example, it is seen that the delay of the path 6 (corresponding to the peak $P_6$) is larger than the delay of the path 3 (corresponding to the peak $P_3$).

Figure 3:
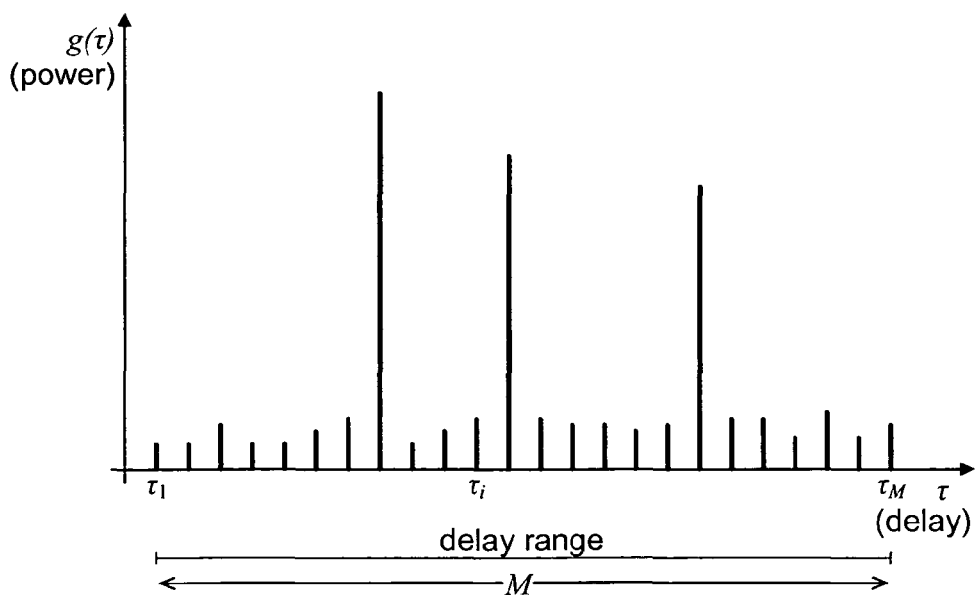
FIG. 3 shows a sampled delay profile corresponding to the profile shown in FIG. 2.

Typically, the delay profile of the received signal will not be available as a continuous curve as the one illustrated in FIG. 2. Instead, it will consist of a number of sample values. This is illustrated in FIG. 3, which shows a sampled power delay profile corresponding to the continuous delay profile shown in FIG. 2. For each delay value $\tau_i$ (where $i \in [1,M]$, i.e. the full possible delay range), the corresponding power value $g(\tau_i)$ is shown. In this case the available estimates of the power delay profile constitutes a contiguous sequence of equally spaced samples, $\tau_i = \tau_0 + i\Delta\tau$, where $\tau_0$ is a possible shifting of the zero position of the delay axis.

The mobile station 2 and the base station 1 may be adapted for use in e.g. a Code Division Multiple Access (CDMA) system or a Wideband Code Division Multiple Access (WCDMA) system, and in that case the mobile station 2 may use a RAKE receiver, which is capable of identifying and tracking the various multipath signals for a given channel. In this way the energy or power of several multipath components can be utilized in the receiver. In the RAKE receiver each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate. Thus the RAKE receiver requires knowledge of the multipath delays and the values of the channel impulse response for all paths. The signal energy from as many physical paths as possible should be collected. This knowledge can be obtained from the delay profiles.

Although reference is here made to a RAKE receiver in a mobile station, it should be noted that the algorithms described below may be used at any CDMA receiver, i.e. in a mobile station or a base station, and the transmission direction may be uplink or downlink.

Figure 4:
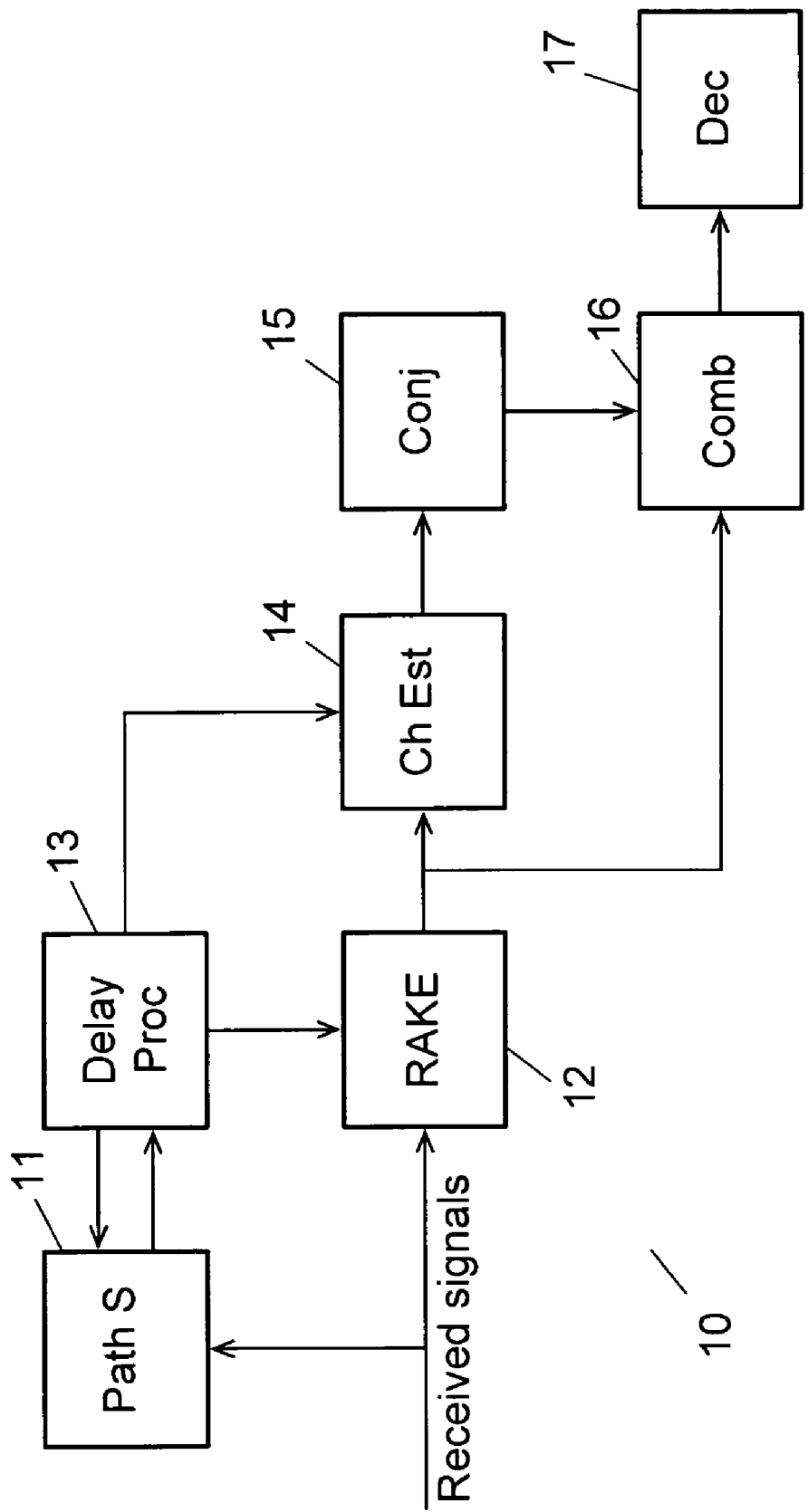
FIG. 4 shows an overview of a RAKE receiver.

Since the structure of the propagation channel does not remain constant over time, the delays of existing paths change, old paths disappear and new paths appear. The changing delays of all known multipath components should be tracked, and new paths should be discovered quickly after they appear. Therefore, infrequently activated limited-range path searchers are typically used for detecting new paths and, in some implementations, for re-detecting temporarily faded existing paths. This is illustrated in FIG. 4, which shows an overview of a RAKE receiver (10).

In the receiver (10), the received spread data signals are supplied to the path searcher 11 and the RAKE unit 12. The path searcher 11 is a device that periodically computes instantaneous impulse response estimates (complex or power, or signal to interference ratio) over a range of delays that is also called a path search window. The complex or power values for a given delay value may be estimated e.g. by correlating the received data for pilot symbols with an appropriately delayed copy of the spreading sequence. Since the path searcher 11 has traditionally been used only to detect the existence of paths, its output resolution is typically lower than that required by the RAKE unit 12. The detected path delays, i.e. the delays representing peaks in the delay profile, are then processed in the delay processing 13 and delivered to the RAKE unit 12 and a channel estimator 14. In the figure there is a feedback signal from the delay processing 13 to the path searcher 11. This is for adjusting the center of the path searcher window, to account for movements in the propagation channel time delay profile.

The received signals are then despread in the RAKE unit 12, in which each reported delay is assigned a RAKE finger, and each RAKE finger presents a complex despread data symbol. In the channel estimator 14 channel estimates for each path are calculated from the despread data symbols provided by the RAKE unit 12 and the detected delays provided by the path searcher 11. In the combiner 16 the despread data symbols provided by the RAKE unit 12 are multiplied by the conjugated channel estimates (provided by the conjugating unit 15) and the results used for further decoding in the decoder 17.

In a WCDMA network measurements of the signal quality from neighbouring cells are periodically reported, typically based on pilot signals from e.g. the Common Pilot Channel (CPICH). Three signal quality measurements are performed on the Common Pilot Channel. The Received Signal Strength Indicator (RSSI) is defined as the total received power, including signal and interference, as measured at the antenna connector; the Received Signal Code Power (RSCP) is the received power from the Common Pilot Channel; and $E_c/I_o$ is the ratio of the received energy per PN chip for the Common Pilot Channel to the total transmit power, i.e. $E_c/I_o = $ RSCP/

RSSI. Especially, $E_c/I_o$ and RSCP inform the network of the quality of a given cell. In practice, RSCP and RSSI are computed, which then give $E_c/I_o$.

The path searcher 11 and the delay processing 13 compute RSCP and RSSI. The received signal is correlated with the scrambling code for the cell and the CPICH channelization code, i.e. the CPICH symbols are despread and then accumulated. This is done for a given number of time delays. The strength of the accumulated signal for a given delay rd reflects the power $g(\tau_d)$ contained at this time delay. If it is judged to be higher than a specified noise floor, it is said to represent a multipath and its power contributes to the RSCP.

For a WCDMA system the detection of the multi-path delays has traditionally been done as a two-stage process. First, a wide and relatively coarse path search is done to identify the location of the multi-path delays. The resolution of such a search, i.e. the distance between the delays, is of the order of one chip or less, and the time delays are usually spaced equidistantly. The set of delays processed by the path searcher in this search is referred to as the path searcher window. The number of time delays processed in the path searcher window is approximately 60 to 150. Usually, the received power or signal to interference ratio (SIR) for a particular delay is used as a criterion for the quality of the delay.

Since, as mentioned, the resolution of this first search is typically lower than that required by the RAKE, a localized and finer search has then traditionally been performed over the selected regions of delays, where the number of time delays is approximately 20 to 50. The resolution of this search is usually in the order of half a chip to an eighth of a chip. As previously the SIR or power is used as a quality measure. From the outcome of the localized search a decision is made which delays to use for despreading the data in the RAKE.

Since this two stage solution requires a considerable number of despreaders, it would be advantageous if the localized search could be avoided. Below, a method is therefore described that only relies upon the wide search for finding and monitoring the propagation channel time delays, for selecting the time delays for despreading data, for adjusting the path searcher window and for computing radio link measurement quality values from the monitored cells.

In the description below, the resolution of the wide search is assumed to be half a chip. The same reasoning could, however, be used for a path searcher operating at three quarter chip, or chip resolution. The accuracy of the delays chosen for despreading data is given with a resolution of a quarter of a chip. Again the method described below is easily adjusted to account for a finer or coarser resolution.

The function of the path searcher itself is well known and will not be described in further detail here. It is assumed that the path searcher 11 or the delay processing 13, as mentioned above, provides the received signal strength indicator $RSSI^{samp}$, i.e. the total received power for the frequency we are camping on at the time we are running the path searcher, and the power values $P_{c,d}$ for cell c and for the delay indexed as d, where d is taken from a set of time delays equidistantly spaced in time.

First, it is described how to schedule the path searcher activations for the different cells and in what order the post-processing of the results of the path searcher should be done. The proposed scheduling scheme is easy to implement, while flexible enough to accommodate a dynamic path searcher activation time scheduling.

Delays for despreading data in the RAKE are assumed to be chosen every $T_{delay\ selection}$ frame. This is a parameter that could change depending on the speed of the mobile and the frequency with which new propagation channel delays occur. Measurement information, such as received signal code power RSCP and received signal strength indicator RSSI, are collected every $T_{measurement}$ frames. The value of $T_{measurement}$ depends on the cell mode we are in, which is specified by higher layer scheduling. For example, $T_{measurement}$ is 20 frames in Cell DCH (Dedicated CHannel) mode.

A frame counter $n_c$, which is initialized, e.g. to zero, is associated with every cell c. The counter is incremented every frame by one, up to a maximum value of $N_c$. The counter is decreased by $\Delta n_c$ every time the path searcher for the cell is activated. As soon as the counter $n_c$ reaches $T_{delay\ selection}$ the cell is put in a first-in-first-out (FIFO) queue or list that will run the path searcher for the cell in question. Typically, we would choose $N_c$ as $1.5 T_{delay\ selection}$, and $\Delta n_c$ as $T_{delay\ selection}$. It should be noted that the counter $n_c$ keeps incrementing its value regardless whether the cell is in the queue or not. With a suggested parameter setting, we see that if a cell has to wait for some time in the queue before being served, this will be remembered as the counter $n_c$ might have reached its maximum value. In this case a new path searcher activation for the cell will be put in the queue within $0.5 T_{delay\ selection}$ frames. Thus the reason for having $N_c$ larger than $T_{delay\ selection}$ is to accommodate for any unexpected delays (due to higher priority utilization of the path searcher) in the path searcher activation for a cell from the time it is put into the queue until it is executed. Over time we will then be running the path searcher on an average every $T_{delay\ selection}$ frames. Here we assume that it is possible on an average basis to schedule all the required path searcher activation, that is, $T_{delay\ selection}$ is not too small. If each path searcher activation is 4 slots long $T_{delay\ selection}$ could be 6 frames or more.

Figure 5:
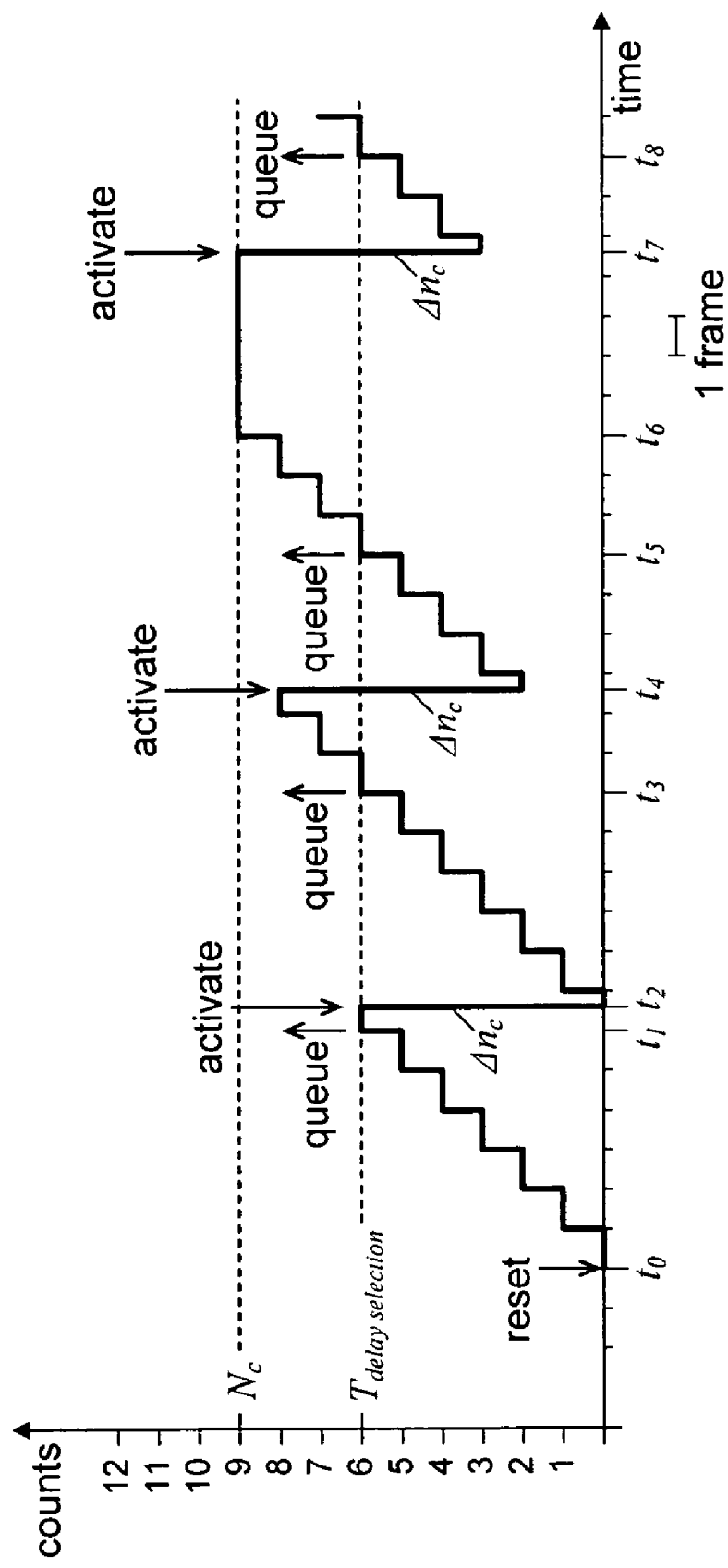
FIG. 5 shows how a counter for scheduling path searcher runs is incremented and decremented.

This is illustrated in FIG. 5. It is seen that the counter for a given cell is reset to zero at time $t_0$. After one frame, the counter is incremented by one, and this is repeated until the counter at time $t_1$ reaches $T_{delay\ selection}$, which is here set to 6 frames, and the cell is placed in the queue for a path search to be performed. In this situation, it assumed that a path search for the cell can be activated within a short time. Thus within the next frame, at time $t_2$, the activation of the path searcher causes the counter value to be decreased by $\Delta n_c$, which here equals $T_{delay\ selection}$, i.e. 6 frames, so that the counter value is again zero. The counter continues to be incremented by one after each frame.

Next, a situation is illustrated in which the activation of the cell is delayed a few frames after the cell has been placed in the queue for a path search to be performed. Again at time $t_3$ the counter reaches $T_{delay\ selection}$, and the cell is placed in the queue. However, since the path search is actually not activated until a few frames later, the counter is still incremented two times more, before the activation of the path searcher causes the counter value to be decreased by $\Delta n_c$ at time $t_3$. However, this time the counter value is only decreased to the value two, and thus already at time $t_5$ the counter again reaches $T_{delay\ selection}$, and the cell is placed in the queue. Thus it is seen that the cell is placed in the queue $T_{delay\ selection}$ frames after it was placed there the previous time although the actual activation of the path searcher was delayed.

Finally, a situation with a longer delay is illustrated. At time $t_6$ the counter reaches the maximum value $N_c$, which is here set to the value nine (which equals $1.5 T_{delay\ selection}$) and the counter remains at this value until the path searcher is finally activated at time $t_7$. This time the counter value is only decreased to the value three, and thus already at time $t_8$ the counter again reaches $T_{delay\ selection}$, and the cell is placed in the queue. Thus with the values used in this example, it is seen that even after a long delay, the cell will be placed in the queue again within 0.5 $T_{delay\ selection}$ frames after the activation of the path searcher.

Regarding measurements, the set of cells that we do measurements on or receive data from will be updated every $T_{measurement}$ frame. Knowledge of how many cells in total we are processing during a certain measurement interval gives us a clue to how many $RSSI^{samp}$ samples we can average or filter during the measurement interval, with the purpose of reducing the noise in the estimation of RSSI. For the frequency we are camping on, let the total number of cells be denoted as $N_{RSSI}$. The filter parameter in the filtering of the $RSSI^{samp}$ values is then made to depend on $N_{RSSI}$. This will be used below.

Figure 6:
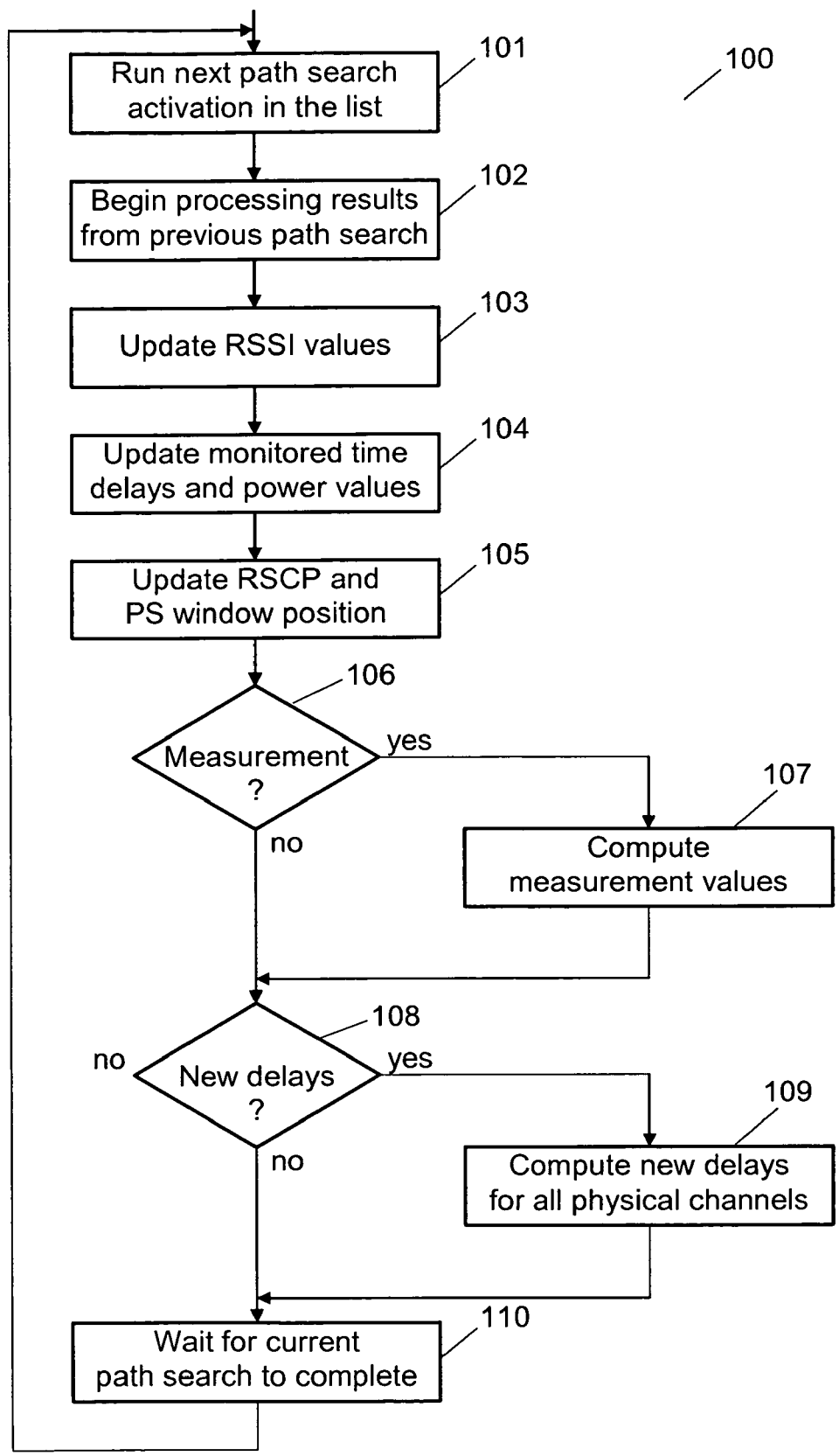
FIG. 6 shows a flow chart illustrating an overview of path searcher scheduling.

It will now be described how the delay selection, measurements, and path searcher window placement interconnect. FIG. 6 shows a flow chart 100 giving an overview of the flow of activities. It is noted that in the two diamond boxes 106 and 108 the questions are asked, whether there is a request for measurement information or for updating the delays used for despreading the data in the RAKE. When in time such requests are coming is determined by the scheduling assumptions described above. Observe that a request might not immediately be expedited if other blocks are currently being processed. Next, we will go into the details of each step of the flow chart.

Step 101 polls the list of pending path searcher activations, i.e. the queue mentioned above for a path search to be performed, and selects the next item in the list or queue. The step will launch the path searcher activation as soon as it can find the necessary consecutive slots for it to run on. We can always assume that we have knowledge of the transmission pattern at least one frame ahead. Once we have launched a path searcher activation, we begin (step 102) processing the information, from the just finished path searcher activation, i.e. steps 103 and onwards.

Alternatively, we could schedule the path searcher to run a predetermined number of activations, say four at a time, while processing the finished results. In step 102, for the latter implementation, we should then check if all finished path searcher activations have been processed, and if so, configure the sequencer, controlling the path searcher, with another batch of path searcher activations, and then move on to process or continue processing the finished path searcher results.

First, in step 103, RSSI values are updated. The $RSSI^{samp}$ sample value, calculated over the length of the path searcher activation, is provided by the path searcher hardware block. A filtered received signal strength indicator $RSSI_{filt}$ may thus be updated as $$RSSI_{filt} = \lambda_{RSSI}(RSSI^{samp} - RSSI_{filt}) + RSSI_{filt},$$

where the filtering factor $\lambda_{RSSI}$ is a function of $N_{RSSI}$ mentioned above. More precisely, $\lambda_{RSSI}$ may be defined as $$\lambda_{RSSI} = \frac{1}{\text{floor}(T_{measurement}/T_{delay\ selection})\max(1, N_{RSSI})},$$

where the floor function performs a rounding to the next closest smaller integer value.

By selecting the filtering factor in such a way, we are essentially approximating the average of all the $RSSI^{samp}$ samples over the measurement interval $T_{measurement}$. If this is the first sample, $\lambda_{RSSI}$ can be set to 1. Alternatively, we could compute the moving average of the stored RSSI samples over the measurement period and store it as $RSSI_{filt}$.

Next, in step 104 the monitored time delays and the corresponding power values are updated. It is here noted that the monitored time delays are usually stored and processed in software. There is therefore a point of interest to minimize the number of monitored time delays for each cell, despite the fact that the path searcher computes a fixed number of quality values for a range of equidistantly spaced delays. Selecting the complete path searcher window as the set of monitored delays is therefore not a practical option, and thus a number of delays e.g. having the largest power values are selected as the set of monitored delays. In step 104 these monitored time delays and the corresponding power values are updated in view of the just performed path search. Thus instead of just using the delays of the new path search, the already monitored delays are updated taking the old values into account. This can be done by a delay update function, which will now be described.

The delay update function is a function that, given a set of monitored delays and a set of possible new delays, updates the set of monitored delays. The inputs to the function are a set of monitored time delays $\tau_c^{old}$, its power values $P_c^{old}$, and its new samples $\hat{P}_c^{old}$. Further a set of possibly new time delays $\tau_c^{new}$ and its power values $P_c^{new}$, and a noise level $\sigma^2$. The outputs of the function are an updated set of monitored time delays $\tau_c$, and its power values $P_c$. The parameters used by the function are a set of thresholds used when comparing power values $\alpha_{peak}$, $\alpha_{noise}$, $\alpha_1$, $\alpha_2$, a penalty parameter $\rho$ for newly found delays, a filtering parameter $\lambda$, and the maximum number of peaks $N_{Peaks}$, which should be spaced at least four quarter chips apart.

In the present situation, the delay update function can be used with the following inputs:

$\tau_c^{old}$ equals $\tau_c$, where $\tau_c$ is the set of monitored delays for cell c, $\hat{P}_{c,d}^{old} = P_{c,d}$, $\forall \tau(d) \in \tau_c$, where the output of the path searcher is denoted as $P_{c,d}$ for cell c and the time delay indexed by d, and $\tau(d)$ is a mapping of the index d to its corresponding time delay, $P_c^{old}$ is given by the stored values $P_c$, and $P_{c,d}^{new} = P_{c,d}$, $\forall \tau(d) \in \tau_c^{new}$, where $\tau_c^{new}$ is the set of delays corresponding to the $N_{peak,out}$ largest peaks in the current path searcher activation plus it half chip neighbours. It is here implicitly understood that either in hardware or software we have sorting function that extracts the largest $N_{peak,out}$ peaks. The sorting function proceeds by selecting the largest peak and its neighbours, removes these delays from further consideration, then continues to search for the largest peak and its neighbours among the remaining delays, until $N_{peak,out}$ peaks have been selected. Obviously, any half-chip neighbour that falls outside the path searcher window will not be part of the $\tau_c^{new}$ set, since there are no associated power values.

Let the noise $\sigma^2$ be given by $RSSI_{filt}$.

The parameter values can be selected as

| Parameter | Suitable range of values | Examples of suitable values |
|---|---|---|
| $\alpha_{peak}$ | 0 to 0.1 | 0 |
| $\alpha_{noise}$ | 0 to 0.1 | 0 |
| $\alpha_1$ | 0.05 to 1 | 0.125 |
| $\alpha_2$ | 0.05 to 1 | 0.0625 |
| $\rho$ | 0.05 to 1 | 0.5 |
| $\lambda$ | 0.02 to 0.2 | 0.1 |
| $N_{peak}$ | 6 to 12 | 10 |
| fg | 0 or 1 | 0 |

We begin by adjusting the power values for the union of time delays $\tau_c^{old}$ and $\tau_c^{new}$. We denote the adjusted power values $\tilde{P}_c$. Below $d(\tau)$ is the index corresponding to the time delay $\tau$. The following conditional statements are then executed.

If $\tau \in \tau_c^{old}$ and $\tau \in \tau_c^{new}$ then $$\tilde{P}_{c,d(\tau)} = \begin{cases} \lambda(\hat{P}_{c,d(\tau)}^{old} - P_{c,d(\tau)}^{old}) + P_{c,d(\tau)}^{old} & \text{if } P_{c,d(\tau)}^{old} > \alpha_1 \hat{P}_{c,d(\tau)}^{old}, \\ 0.5(\hat{P}_{c,d(\tau)}^{old} + P_{c,d(\tau)}^{old}) & \text{if } \alpha_2 \hat{P}_{c,d(\tau)}^{old} < P_{c,d(\tau)}^{old} \leq \alpha_1 \hat{P}_{c,d(\tau)}^{old}, \\ \hat{P}_{c,d(\tau)}^{old} & \text{if } P_{c,d(\tau)}^{old} \leq \alpha_2 \hat{P}_{c,d(\tau)}^{old}. \end{cases}$$

From the definition of the new power value $\tilde{P}_{c,d(\tau)}$, we see that there is a bias in keeping a delay if it is part of the monitored set. The second row in $\tilde{P}_{c,d(\tau)}$ is to produce a smooth transition between the cases of a very strong sample, row three, and a very weak sample, row one. The idea is that the thresholds $\alpha_1$ and $\alpha_2$ should be chosen such that row one is activated most of the time, that is, filtering of the samples is predominant.

We can generalize the previous update as $$\tilde{P}_{c,d(\tau)} = \begin{cases} \lambda_1(\hat{P}_{c,d(\tau)}^{old} - P_{c,d(\tau)}^{old}) + P_{c,d(\tau)}^{old} & \text{if } P_{c,d(\tau)}^{old} > \alpha_1 \hat{P}_{c,d(\tau)}^{old}, \\ \lambda_2(\hat{P}_{c,d(\tau)}^{old} - P_{c,d(\tau)}^{old}) + P_{c,d(\tau)}^{old} & \text{if } \alpha_2 \hat{P}_{c,d(\tau)}^{old} < P_{c,d(\tau)}^{old} \leq \alpha_1 \hat{P}_{c,d(\tau)}^{old}, \\ \lambda_3(\hat{P}_{c,d(\tau)}^{old} - P_{c,d(\tau)}^{old}) + P_{c,d(\tau)}^{old} & \text{if } P_{c,d(\tau)}^{old} \leq \alpha_2 \hat{P}_{c,d(\tau)}^{old}. \end{cases}$$

for some filter constant $\lambda_1 \leq \lambda_2 \leq \lambda_3$. Obviously, we could generalize this to even more levels of different filtering depending on how the $P_{c,d(\tau)}^{old}$ values relates to the $\hat{P}_{c,d(\tau)}^{old}$, or to only two levels.

If there is no old value $P_{c,d(\tau)}^{old}$, i.e. it is undefined (see below), we let $\tilde{P}_{c,d(\tau)}$ equal $\hat{P}_{c,d(\tau)}^{old}$.

If $\tau \notin \tau_c^{old}$ and $\tau \in \tau_c^{new}$ then $\tilde{P}_{c,d(\tau)} = \rho \hat{P}_{c,d(\tau)}^{new}$.

This statement says that we are prudent in letting in new delays into the monitored set, unless it is a delay of good quality.

If $\tau \in \tau_c^{old}$ and $\tau \notin \tau_c^{new}$ then $\tilde{P}_{c,d(\tau)} = \lambda(\hat{P}_{c,d(\tau)}^{old} - P_{c,d(\tau)}^{old}) + P_{c,d(\tau)}^{old}$.

If there is no old value $P_{c,d(\tau)}^{old}$, i.e. it is undefined (see below), we let $\tilde{P}_{c,d(\tau)}$ equal $\hat{P}_{c,d(\tau)}^{old}$.

We now have power values for the union of time delays $\tau_c^{old}$ and $\tau_c^{new}$, and a delay pruning and selection function can be applied to the set of time delays $\tau_c^{old} \cup \tau_c^{new}$, the corresponding power values $\tilde{P}_c$, and the noise $\sigma^2$ in order to reduce the number of delay values to the maximum number $N_{Peaks}$ of monitored values or peaks.

The delay pruning and selection function is a function that, given a set of delays for a cell, removes time delays associated with weak power values, such that a given minimal spacing exists between the delays, whereupon a subset of the delays corresponding to the strongest power values is selected. The inputs to the function are a given number of delays, their power values, and the noise level $\sigma^2$. The outputs of the function are at most $N_{selected}$ delays, spaced at least $\tau_{spacing}$ apart from each other. The parameters used by the function are a maximum number of delays $N_{selected}$, that we would like to select, thresholds $\alpha_{peak}$ and $\alpha_{noise}$ for selecting the delays, a time window $\lfloor t_{left}, t_{right} \rfloor$ from which all delays must be selected (If $t_{left} > t_{right}$, there is no requirement that the delays should fit within a certain time window), a minimal spacing $\tau_{spacing}$ between the delays (The unit of $\tau_{spacing}$ is in quarter chips), a time delay of the first path of the cell, $\tau_{first}$, and a parameter fg that when set to one tries to space the selected delays as uniformly as possible, i.e. in a fixed grid. In the present situation, the parameter fg is set to zero.

If there is a requirement stating that the delays should fit within the window $\lfloor t_{left}, t_{right} \rfloor$, the function begins by removing all delays that fall outside of the window $\lfloor t_{left}, t_{right} \rfloor$. If a cell's first path, $\tau_{first}$, falls outside the interval, all its other paths are also dropped. This is because such a cell should as soon as possible be removed from the list of cells that are used in receiving data.

The delays that are at least $100\alpha_{peak}\%$ of the maximum power value and $100\alpha_{noise}\%$ of the noise level $\sigma^2$ are selected. If $\alpha_{peak}$ is negative, the first (power) threshold does not apply, and if $\alpha_{noise}$ is negative, the second (noise) threshold does not apply.

The following operations are done if fg is set to zero, which is the case here. For the set of delays just selected, the delay with the largest power value is chosen and it is tagged as a peak 'P'; all delays within a distance strictly less than $\tau_{spacing}$ of the newly found peak are removed. Out of the remaining delays, i.e. delays that have not been tagged or removed, the delay with the largest power value is selected and it is tagged as a peak 'P'. Again, all delays within a distance strictly less than $\tau_{spacing}$ of the newly found peak are removed. The process is continued until all delays have been tagged or removed or $N_{selected}$ delays have been tagged. The output set of delays is given by the delays tagged as 'P'.

The delay pruning and selection function just described is applied to the set of time delays $\tau_c^{old} \cup \tau_c^{new}$, the corresponding power values $\tilde{P}_c$, and the noise $\sigma^2$ with the parameter choices $N_{selected} = N_{peak}$, $t_{left} > t_{right}$, $\alpha_{peak}$, $\alpha_{noise}$, $\tau_{spacing}$ equal to 4 quarter chips, and fg=0. The resulting set of time delays are called $\tau_c^{man,peak}$.

The new monitored set of time delays, $\tau_c$, will now equal the set $\tau_c^{man,peak}$ together with the half chip neighbours of each delay in the set, because these neighbours will be needed below. Now, if a delay in $\tau_c$ is contained in the set $\tau_c^{old} \cup \tau_c^{new}$, it will have a power value associated with it, given by the set $\tilde{P}_c$, otherwise, we set the power value as undefined. The resulting set of power values, corresponding to the set of time delays $\tau_c$, is denoted as $P_c$.

The output of the delay update function replaces the stored values $P_c$ and $\tau_c$. This completes step 104.

Figure 7:
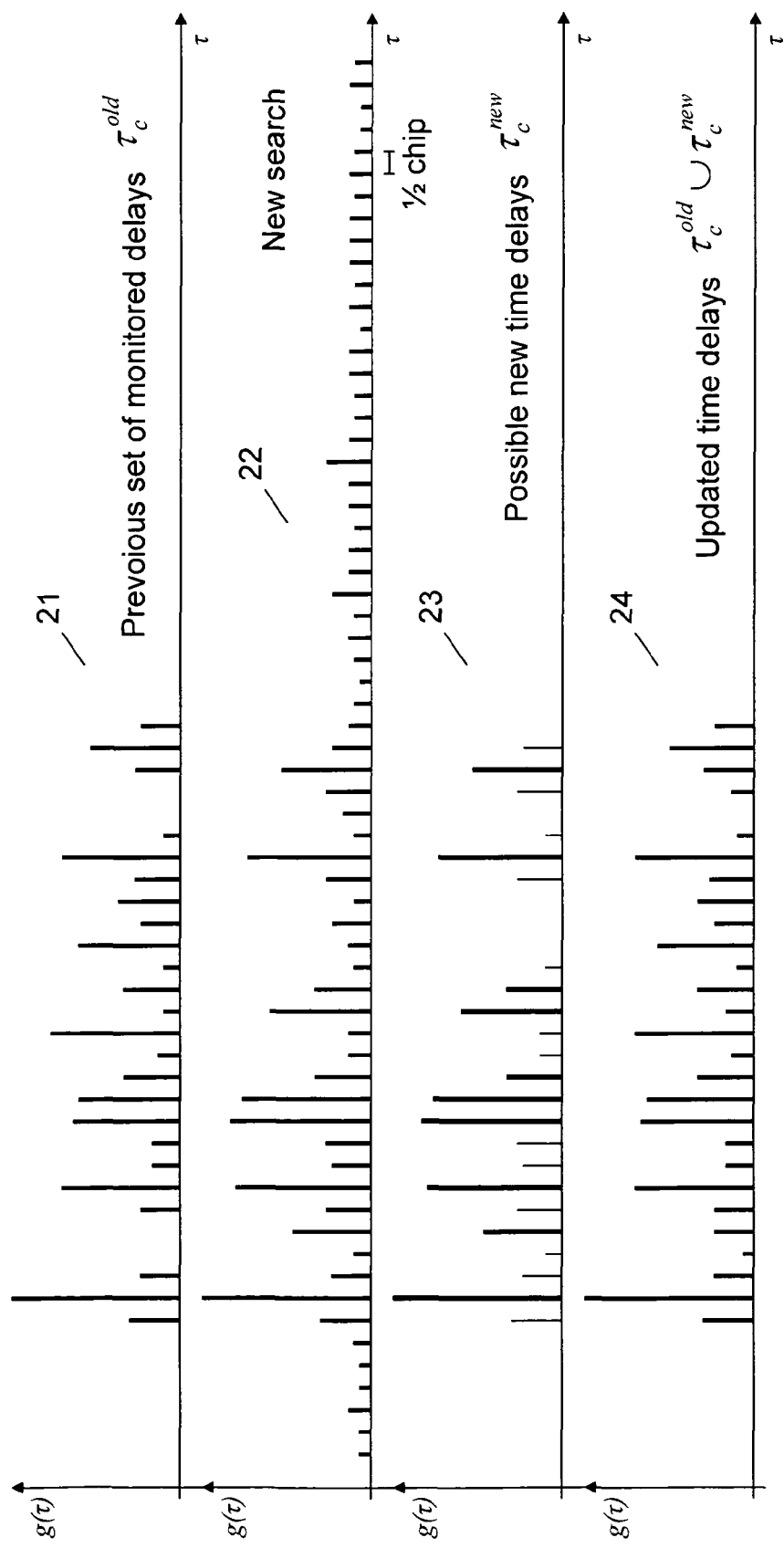
FIGS. 7 and 8 show a series of delay profiles illustrating the updating of a monitored delay profile.
Figure 8:
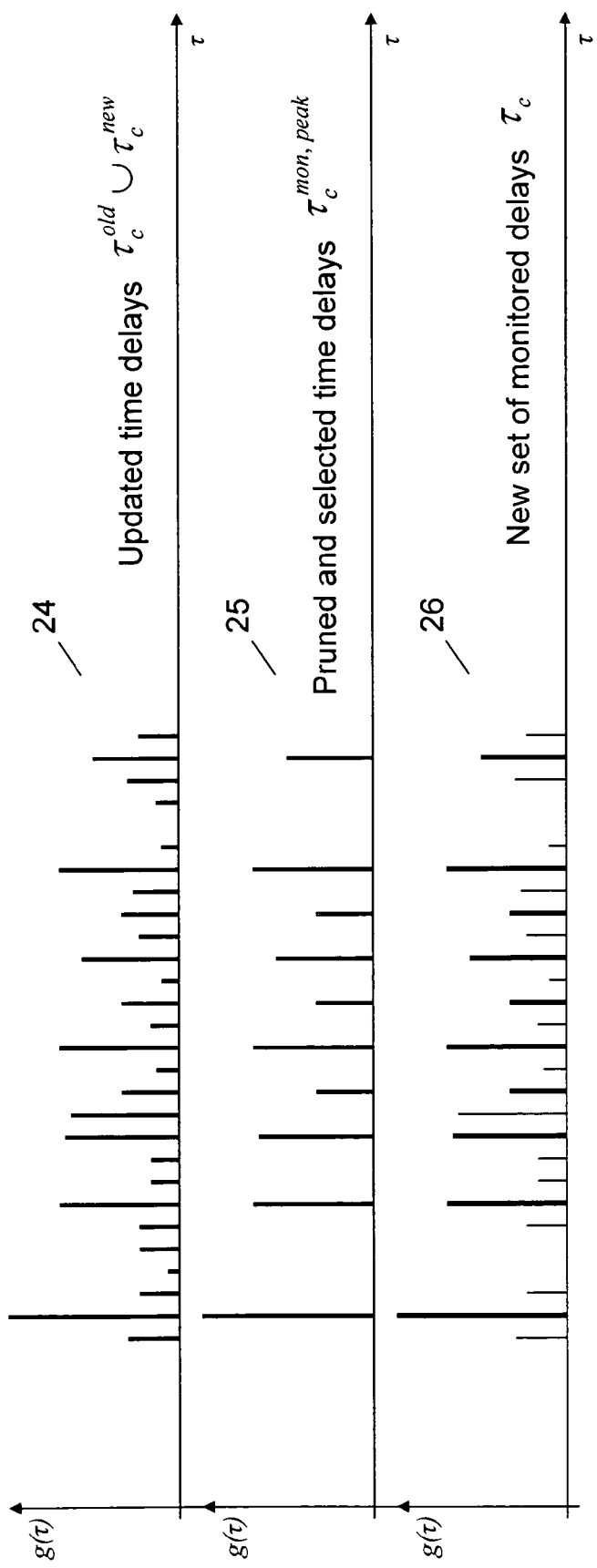

The functions of step 104 are also illustrated by the delay profiles shown in FIGS. 7 and 8. The upper profile 21 in FIG. 7 is an example of a set of monitored delays that was stored for a given cell c after the previous path searcher activation. This is the set that is designated $\tau_c^{old}$ above. The next profile 22 shows the result of a new path search just performed. It is seen that in this example, the result of the search contains 64 equidistantly spaced time delays with a resolution of half a chip. From this profile 22 the set of possible new delays $\tau_c^{new}$ is found as the set of delays corresponding to the $N_{peak,out}$ (which is here set to 10) largest peaks in the new path search result plus their half chip neighbours. This is shown in the third profile 23 of FIG. 7 with the 10 largest peaks shown in a thick line and their half chip neighbours shown in a thinner line.

The lower profile 24 of FIG. 7 shows the result of the updating function described above in which the old set of monitored delays $\tau_c^{old}$ is updated in view of the set of possible new delays $\tau_c^{new}$. Most of the delays belong to the group where $\tau \in \tau_c^{old}$ and $\tau \in \tau_c^{new}$, and they all fulfil the criteria $P_{c,d(\tau)}^{old} > \alpha_1 \hat{P}_{c,d(\tau)}^{old}$, so that the updated values are calculated according to the corresponding expression above and the parameter values mentioned in the above table. A few delays belong to the group where $\tau \notin \tau_c^{old}$ and $\tau \in \tau_c^{new}$ and a few others to the group where $\tau \in \tau_c^{old}$ and $\tau \notin \tau_c^{new}$, and in each case the updated values are calculated as described above, again with the parameter values mentioned in the above table. We now have power values for the union of time delays $\tau_c^{old} \cup \tau_c^{new}$.

The updated power values for the union of time delays $\tau_c^{old} \cup \tau_c^{new}$, which were shown in the lower profile 24 of FIG. 7, are repeated as the upper profile in FIG. 8, and the delay pruning and selection function can now be applied to these delays. As suggested in the above table, the parameters $\alpha_{peak}$ and $\alpha_{noise}$ are set to zero, and thus these thresholds do not apply. A number of peaks ($N_{selected} = N_{peak} = 10$ as suggested above) are then selected by choosing the delay with the largest power value and removing all delays within a distance strictly less than $\tau_{spacing}$ (i.e. one chip) of the newly found peak. Out of the remaining delays the delay with the largest power value is then selected and all delays within a distance strictly less than $\tau_{spacing}$ of the newly found peak are removed. This process is continued until all delays have been chosen or removed, or $N_{selected}$ delays have been chosen as in this example. The resulting set of time delays is $\tau_c^{mon,peak}$ as shown in the second profile 25 of FIG. 8.

Finally, as shown in the lower profile 26 of FIG. 8, the new set of monitored time delays $\tau_c$ and their corresponding power values $P_c$ will now be the set $\tau_c^{mon,peak}$ together with the half chip neighbours of each delay in the set. The power values of the set $\tau_c^{mon,peak}$ are shown in a thick line, while their half chip neighbours are shown in a thinner line. It can be seen that the new (updated) set of monitored time delays is not much different from the old set, which indicates, as mentioned above, that the updating function has a bias in keeping a delay, if it is part of the monitored set.

In step 105, RSCP (Received Signal Code Power) and the path searcher window position are updated. An RSCP sample value is given by the sum of the path searcher output powers for the time delays associated with propagation channel delays. There are different methods of estimating RSCP, one way could be to apply a delay selection function for appropriately chosen thresholds to get the time delays used in the summation.

The delay selection function is a function that, given a set of delays from a cell, selects the subset containing the largest power values. The inputs to the function are a given number of delays, their power values, and the noise level $\sigma^2$. The outputs of the function are at most $N_{selected}$ delays. The parameters used by the function are a maximum number of delays $N_{selected}$, that we would like to select, thresholds $\alpha_{peak}$ and $\alpha_{noise}$ for selecting the delays, a time window $\lfloor t_{left}, t_{right} \rfloor$ from which all delays must be selected (If $t_{left} > t_{right}$, there is no requirement that the delays should fit within a certain time window), and a time delay of the first path of the cell $\tau_{first}$.

If there is a requirement stating that the delays should fit within the window $\lfloor t_{left}, t_{right} \rfloor$, the function begins by removing all delays that fall outside of the window $\lfloor t_{left}, t_{right} \rfloor$. If the cell's first path, defined as $\tau_{first}$, falls outside the interval, all its other paths are also dropped. This is because such a cell should as soon as possible be removed from the list of cells that are used in receiving data.

The maximum power value is found and additional delays, up to a total of $N_{selected}$, that are at least $100\alpha_{peak}\%$ of the maximum power value and $100\alpha_{noise}\%$ of the noise level $\sigma^2$ are selected. If $\alpha_{peak}$ is negative, the first (power) threshold does not apply, and if $\alpha_{noise}$ is negative, the second (noise) threshold does not apply.

The placement of the path searcher window can be done in a number of well known ways. One way is by centering the window on the filtered center of gravity. Once a new path searcher window has been selected, we need to remove any delays from the monitored delay profile that does not any longer fall within the new path searcher window.

Having performed the above processing steps that are done just after the completion of a path search, it is now checked in steps 106 and 108 whether there is a request for measurement values to be computed and/or a request for new delay values to be selected for the RAKE.

If a request for computing the measurement values is detected in step 106, which, as mentioned above, will be the case every $\tau_{measurement}$ frame, the RSCP samples over the measurement period are averaged. Filtering is not recommended since there will be very few samples, typically 1 to 5. This is done for all cells that are subject to measurements. Furthermore, the filtered RSSI and the averaged RSCP over the filtered RSSI, also known as $E_c/N_0$, is computed. These computations are performed in step 107.

Figure 9:
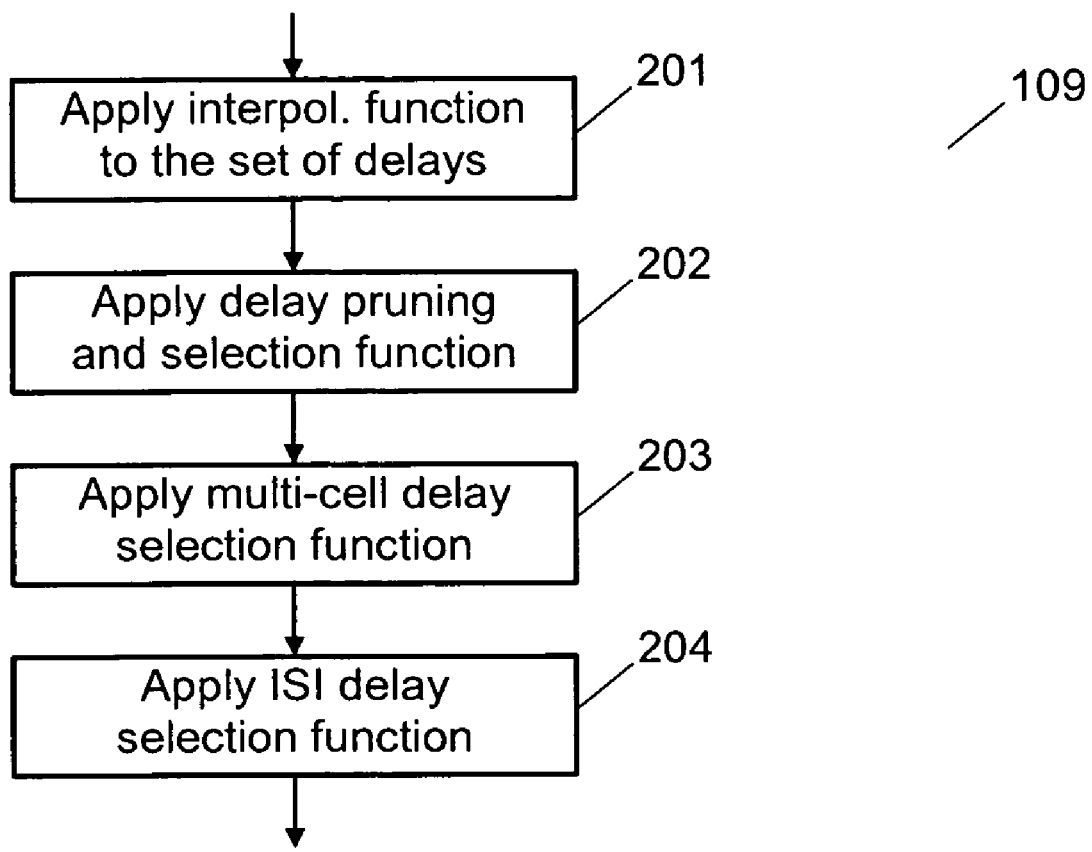
FIG. 9 shows a flow chart illustrating the selection of delay values for the RAKE.

Similarly, if a request for choosing new delays for the RAKE is detected in step 108, which, as mentioned above, will be the case every $T_{delay\ selection}$ frame, the functions of step 109 will be performed. In this step it is decided which fingers to use in the RAKE for despreading data on a given set of physical channels. As shown in FIG. 9, step 109 contains three steps, 201-203, which will be described below. The functions of step 109 are also illustrated by the delay profiles shown in FIG. 10.

Figure 10:
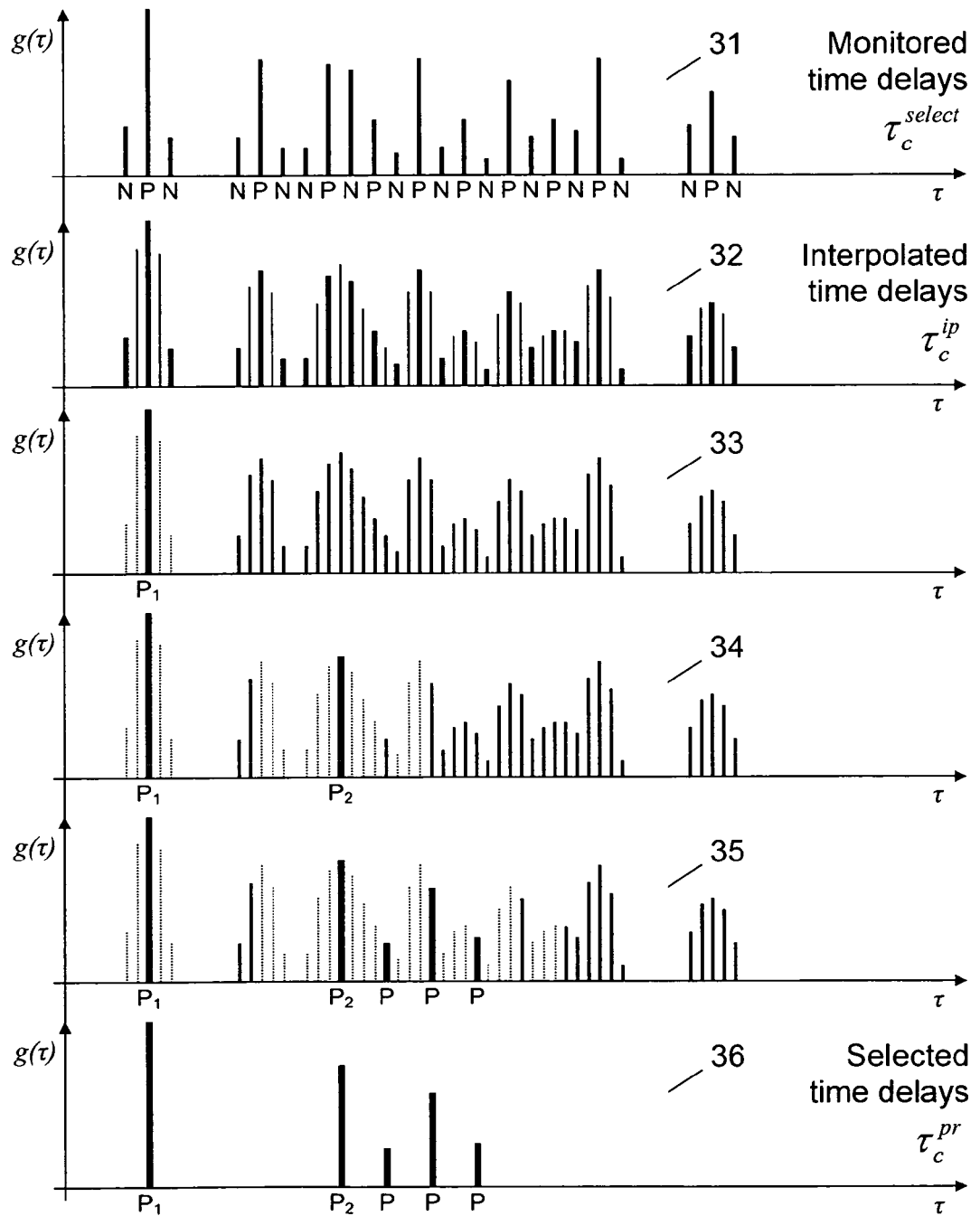
FIG. 10 shows a series of delay profiles illustrating the selection of delay values for the RAKE.

First, in step 201, a delay interpolation function is applied to the set of time delays $\tau_c^{select}$ and its associated power values $P_c$, as illustrated in the upper profile 31 of FIG. 10. Here, we consider all cells c transmitting the physical channels we are interested in finding the propagation channel delays for.

The delay interpolation function is a function that, given a set of delays, interpolates between the delays, whenever possible, using a second order fitting polynomial. The inputs to the function are a given number of delays and their power values. The time delays are in units of quarter chips and have a minimum spacing of half a chip. The outputs of the function are a set of interpolated delays and their corresponding power values.

The delay with the largest power value is chosen, it is tagged as a peak 'P', and its half chip neighbours, if they exist, are tagged as 'N'. The next largest power value is then chosen from the set of non-tagged delays, and it is tagged as a peak 'P', and its half chip neighbours, if they exist, are tagged as 'N'. The procedure is repeated until all delays are tagged. This is shown in the upper profile of FIG. 10.

All the delays tagged as a peak 'P' are gone through. If a peak has exactly two neighbours, we compute the power values a quarter chip from the peak using polynomial interpolation. The polynomial coefficients are derived from the peak and its two neighbours. That is, let n be the time location of the peak, where the unit is in quarter chips. Then the neighbours will have the time locations n−2 and n+2. Let $y_1$ be the power value for the peak and $y_0, y_2$ the power values for the neighbours. Let $p(x)$ be the second order polynomial that satisfies $p(n-2)=y_0$, $p(n)=y_1$, and $p(n+2)=y_2$. The Lagrange form of the interpolating polynomial is given by $$p(x) = y_0 \frac{(x-n)(x-n-2)}{8} -$$

-continued $$y_1 \frac{(x-n+2)(x-n-2)}{4} + y_2 \frac{(x-n+2)(x-n)}{8}.$$

We have that the delays a quarter chip away from the peak take the values $$p(n-1) = \frac{3y_0}{8} + \frac{3y_1}{4} - \frac{y_2}{8},$$

$$p(n+1) = -\frac{y_0}{8} + \frac{3y_1}{4} + \frac{3y_2}{8}.$$

On the other hand, if the peak has less than two neighbours, we compute no interpolated values for the quarter chip delays on either side of the peak.

The outputs of this function are called $\tau_c^{ip}$ and $P_c^{ip}$. This is shown in the second profile 32 of FIG. 10 with the original power values shown in a thick line and the interpolated values shown in a thinner line.

Then, in step 202 a delay pruning and selection function is applied to the set of time delays $\tau_c^{ip}$ and the power values $P_c^{ip}$.

The delay pruning and selection function is a function that, given a set of delays for a cell, removes time delays associated with weak power values, such that a given minimal spacing exists between the delays, whereupon a subset of the delays corresponding to the strongest power values is selected. The inputs to the function are a given number of delays, their power values, and the noise level $\sigma^2$. The outputs of the function are at most $N_{selected}$ delays, spaced at least $\tau_{spacing}$ apart from each other. The parameters used by the function are a maximum number of delays $N_{selected}$, that we would like to select, thresholds $\alpha_{peak}$ and $\alpha_{noise}$ for selecting the delays, a time window $\lfloor t_{left}, t_{right} \rfloor$ from which all delays must be selected (If $t_{left} > t_{right}$ there is no requirement that the delays should fit within a certain time window), a minimal spacing $\tau_{spacing}$ between the delays (The unit of $\tau_{spacing}$ is in quarter chips), a time delay of the first path of the cell, $\tau_{first}$, and a parameter fg that when set to one tries to space the selected delays as uniformly as possible, i.e. in a fixed grid. The parameter fg may also be set to two, in which case it forces all delay time differences to be an integer multiple of $\tau_{spacing}$ chips. In the pre-sent situation, the parameter fg is typically set to one.

In the present situation, the delay pruning and selection function can be applied to the set of time delays $\tau_c^{ip}$ and the power values $P_c^{ip}$ with the parameters given as follows

| Parameter | Suitable range of values | Examples of suitable values |
|---|---|---|
| $\tau_{spacing}$ | | 4 |
| $N_{selected}$ | 5 to 10 | 5 |
| $\alpha_{peak}$ | 0 to 0.1 | 0.03 |
| $\alpha_{noise}$ | 0 to 0.1 | 0.0015 (−28 dB) |
| $\lfloor t_{left}, t_{right} \rfloor$ | | Enforce limits if this is required by the 3GPP specification or because of hardware limitations. |
| fg | 0 or 1 | 1 |

Let the noise $\sigma^2$ be given by $RSSI_{filt}$.

If there is a requirement stating that the delays should fit within the window $\lfloor t_{left}, t_{right} \rfloor$, the function begins by removing all delays that fall outside of the window $\lfloor t_{left}, t_{right} \rfloor$. If a cell's first path, $\tau_{first}$, falls outside the interval, all its other paths are also dropped. This is because such a cell should as soon as possible be removed from the list of cells that are used in receiving data. If the cell's first path, defined as $\tau_{first}$, falls outside the interval, then the process does not proceed to the following step, and an empty set of delays is output.

The delays that are at least $100\alpha_{peak}\%$ of the maximum power value and $100\alpha_{noise}\%$ of the noise level $\sigma^2$ are selected. If $\alpha_{peak}$ is negative, the first (power) threshold does not apply, and if $\alpha_{noise}$ is negative, the second (noise) threshold does not apply. In the example shown in FIG. 10, all power values are above the thresholds defined by the parameter values mentioned above, and thus all delays are selected.

The following is done if fg is set to one, which is typically the case here, because in this situation a fixed grid may be advantageous. For the set of delays just selected above, the time delay with the largest power value, given by $\tau_{P_1}$, is selected, it is tagged as 'P', and the delay $\tau_{P_1}$ and the delays within a distance strictly less than $2 \cdot \tau_{spacing}$ of $\tau_{P_1}$, except for the delays $\pm \tau_{spacing}$ (six on each side of $\tau_{P_1}$ if we work on quarter chip resolution) are removed from further consideration. Removing the delays within a distance strictly less than $2\tau_{spacing}$ is done for canceling potential strong side lobes. Next, it is examined if $\tau_{P_1} + \tau_{spacing}$ is part of the delays selected above as being above the power and noise thresholds. If yes, it is tagged as 'P', and along with the delays within a distance strictly less than $2 \cdot \tau_{spacing}$ of $\tau_{P_1} + \tau_{spacing}$, except the delay $\tau_{P_1} + 2\tau_{spacing}$, it is removed from further consideration. The procedure is repeated until, for some positive integer n, $\tau_{P_1} + n \cdot \tau_{spacing}$ is not part of the selected delays. The whole scheme is then repeated for the delays to the left of $\tau_{P_1}$.

For the remaining delays, the procedure is repeated, i.e. select the time delay with the largest power value, given by $\tau_{P_2}$, tag it as 'P', and remove from further consideration the delays within a distance strictly less than $2 \cdot \tau_{spacing}$ of $\tau_{P_2}$, whereafter we examine if $\tau_{P_2} \pm \tau_{spacing}$ is part of the selected delays, if yes, tag them as 'P', and remove from further consideration the delays within a distance strictly less than $2 \cdot \tau_{spacing}$ of $\tau_{P_2} \pm \tau_{spacing}$, and so forth.

In the operations just described, delays within a distance of $2 \cdot \tau_{spacing}$ of the delay in question are removed. However, as an example, the method can also be applied with the modification that only delays within a distance of $\tau_{spacing}$ are removed.

We are done when $N_{selected}$ delays have been tagged as 'P' or when we have exhausted the set of possible candidates for being tagged as 'P'. The output is given by the set of delays tagged as 'P'. The output can be called $\tau_c^{pr}$ and $P_c^{pr}$.

If, however, a fixed grid is not wanted in relation to the delay values for the RAKE, fg is set to zero and the following operations are done instead. For the set of delays just selected, the delay with the largest power value is chosen and it is tagged as a peak 'P'; all delays within a distance strictly less than $\tau_{spacing}$ of the newly found peak are removed. Out of the remaining delays, i.e. delays that have not been tagged or removed, the delay with the largest power value is selected and it is tagged as a peak 'P'. Again, all delays within a distance strictly less than $\tau_{spacing}$ of the newly found peak are removed. The process is continued until all delays have been tagged or removed, or $N_{selected}$ delays have been tagged. The output set of delays is given by the delays tagged as 'P'.

As mentioned above, the parameter fg may also be set to two. If fg is set to two the following is done. For the set of delays just selected above, the time delay with the largest power value, given by $\tau_{P_1}$, is selected and tagged as 'P', and all delays, except the ones at $\tau_{P_1} + n \cdot \tau_{spacing}$, where n is all possible integers, are removed from further consideration. It is observed that so far only one delay has been tagged as 'P'. For the remaining delays, the time delay with the largest power value is selected, tagged as 'P' and removed from further consideration. The procedure is then repeated until $N_{selected}$ delays have been tagged as 'P' or when we have exhausted the set of possible candidates for being tagged as 'P'. The output is given by the set of delays tagged as 'P'.

The process described above is also illustrated in FIG. 10. In the third profile 33 the peak with the largest power value is selected as $P_1$ with the corresponding delay value $\tau_{P_1}$, and the delays within a distance strictly less than $2\cdot\tau_{spacing}$ of $\tau_{P_1}$, except for the delays $\pm\tau_{spacing}$ are removed from further consideration. With $\tau_{spacing}$ being one chip, only the four delays closest to $\tau_{P_1}$ are removed. This is illustrated with dotted lines. Since the values $\tau_{P_1}\pm\tau_{spacing}$ in this case are not part of the selected delays, the time delay with the largest power value among the remaining delays is then selected as $P_2$ with the corresponding delay value $\tau_{P_2}$, and the delays (in this case six delays) within a distance strictly less than $2\cdot\tau_{spacing}$ of $\tau_{P_2}$, except for the delays $\pm\tau_{spacing}$ are removed, which is illustrated with dotted lines in the fourth profile 34 of FIG. 10. While the delay $\tau_{P_2}-\tau_{spacing}$ is not part of the selected delays, the delay $\tau_{P_2}+\tau_{spacing}$ is part thereof, and therefore the latter value is also tagged as P, and the delays within a distance strictly less than $2\cdot\tau_{spacing}$ thereof, except for the delays $\pm\tau_{spacing}$, are removed. This process is continued until five (i.e. $N_{selected}$) delays have been tagged as P. This is shown in the fifth profile 35 of FIG. 10. The set of these five delay values is thus the set $\tau_c^{pr}$, which is the set of delays to be used for the RAKE for the cell under consideration. This set of delays is shown in the lower profile 36 of FIG. 10.

If the physical channel is sent from only one cell we are done, otherwise, we proceed to step 203. In step 203 a multi-cell delay selection function is applied to the union of pruned time delays coming from the cells transmitting the physical channel of interest.

The multi-cell delay selection function is a function that, given a set of delays per cell, which are the output from the delay selection function, selects a subset of delays from the cells containing the largest power values. The inputs to the function are a given number of delays and their power values from several cells. The outputs of the function are at most $N_{selected}$ delays. The parameters used by the function are a maximum number of delays, $N_{selected}$, that we would like to select and a threshold $\alpha_{cell}$ for selecting the delays.

In the multi-cell delay selection function the following parameter setting can be used:

| Parameter | Suitable range of values | Examples of suitable values |
|---|---|---|
| $\alpha_{cell}$ | 0 to 0.4 | 0.3 |
| $N_{selected}$ | 3 to 10 | 5 |

In what follows, we assume that the cells are numbered according to the value of their maximum power value, i.e. cell one contains the highest power value, cell two the second highest power value, and so on. It should be observed that for a given delay, we might have several power values if the delays from multiple cells coincide.

Case I. The $N_{selected}$ largest power values are from cell one, call this set $S_1$. If a path from cell two is $100\alpha_{cell}\%$ of the maximum power value for cell one, the weakest path is removed from the set $S_1$ and it is replaced with the strongest path from cell two. This is done because we know that cell two is completely uncorrelated with the paths from cell one, and its contribution is therefore valuable.

Case II. The $N_{selected}$ largest power values come from cells one and two, call this set $S_{12}$. If a path from cell three is $100\alpha_{cell}\%$ of the maximum power value for cell one, the weakest path is removed from the set $S_{12}$, and it is replaced with the strongest path from cell three. If removing the weakest path means that cell two is not any more contained in the set $S_{12}$, we remove instead the weakest path from cell one. For example, if $N_{selected}$ equals six, and cell one contributes with the five strongest paths, we remove the weakest path from cell one and replace it with the strongest path from cell three. All other cells are ignored.

The procedure can readily be generalized to more cells. Above at most one delay has been replaced with a weaker delay from another cell, but this could also be generalized to comprise the replacement of several delays from multiple cells, however, at most one delay per newly introduced cell.

It should be observed, that except from the DPCH (Dedicated Physical Channel) all other physical channels receive their signal from only one cell.

The procedure may also be used in a so-called "generalized" RAKE (G-RAKE) receiver, which typically uses combining weights that are a function of channel coefficients and a noise covariance that includes information relating to interfering signals. The combining weights are used to combine the despread values in the combiner 16. A G-RAKE receiver differs from a traditional RAKE receiver in that it considers delays in addition to those corresponding to peaks of the desired signal as described above. These other delays are typically chosen to provide information about interference so that the receiver may suppress the interference.

In a traditional RAKE receiver the fingers are chosen, e.g. as described above, such that a maximum amount of energy of the desired signal is collected. In a G-RAKE receiver, however, the finger selection criteria also may collect interference signal information such that a desired amount of interference suppression can be achieved. The G-RAKE can be considered as a type of equalizer, whitening the inter-cell interference as well as mitigating inter-symbol interference (ISI).

Thus if the receiver is a G-RAKE receiver we can proceed to step 204, in which an ISI delay selection function is applied. Its purpose is to select the extra fingers used for the G-RAKE. The extra-fingers do not have to coincide with the peak delays.

The ISI delay selection function is a function that, given a set of propagation channel peaks and its power values, selects a number of extra fingers to be used together with the peaks when despreading data. The inputs to the function are the time delays for the propagation channel, $\tau^{prop}$, and its power values $P^{prop}$. The outputs of the function are a set of extra delays $\tau^{extra}$ used when estimating the covariance matrix of the propagation channel. The parameters used by the function are a number $N_E$ of extra delays and a window $\lfloor t_{left}, t_{right} \rfloor$ within which the extra delays must be contained (It is assumed that the propagation channel delays are contained in the window), and a minimum spacing between delays $\tau_{spacing}$ in units of quarter chips.

All distances between the delays in $\tau^{prop}$ are computed and sorted. Call the set of sorted distances in increasing order $\delta_i$, $i=1, \ldots, N_\delta$, where $N_\delta$ is the total number of distances. $\tau^{extra}$ is set to be the empty set. Next delays will added to the set $\tau^{extra}$. At any time, when the total number of delays in $\tau^{extra}$ equals $N_E$, we are done and interrupt any further processing. The largest power value in $P^{prop}$ is selected, and we let $\tau_{d_1}^{prop}$ be its corresponding time delay. It is checked if (i) $\tau_{d_1}^{prop}+\delta_1$ is within the window $\lfloor t_{left}, t_{right} \rfloor$ and if (ii) $\tau_{d_1}^{prop}+\delta_1$ is at least $\tau_{spacing}$ quarter chips away from the time delay set $\tau^{prop} \cup \tau^{extra}$.

If so, the delay $\tau_{d_1}^{prop}+\delta_1$ is added to the set of extra delays $\tau^{extra}$, which would now consist of one delay. The check in (i) and (ii) is repeated for the potential extra delay $\tau_{d_1}^{prop}+\delta_1$, and it is added to the set $\tau^{extra}$ if it passes.

Next the propagation channel time delay associated with the second largest power value is considered, and it is called $\tau_{d_2}^{prop}$. As before it is checked if the potential extra delay $\tau_{d_2}^{prop}+\delta_1$ passes criteria (i) and (ii) above, and it is added to the set $\tau^{extra}$ if it passes. The procedure is repeated for the potential extra delay $\tau_{d_2}^{prop}-\delta_1$. Then the procedure is repeated for the time delay associated with the third largest propagation channel power value. The process is continued until we have traversed all propagation channel time delays.

Up until now, the same distance $\delta_1$ has been used as an offset for the propagation channel time delays. The whole procedure is now repeated for the distance $\delta_2$, i.e. we check (i) and (ii) for the potential extra delays $\tau_{d_1}^{prop}\pm\delta_2$ where rd, $\tau_{d_1}^{prop}$ as before is the time delay associated with largest power value, and continue until we have traversed all propagation channel time delays. The procedure is then repeated for the distance $\delta_3$, and so forth until we have exhausted all distances. As was said in the beginning, the procedure is stopped at any time when the set $\tau^{extra}$ contains $N_E$ delays. It should be observed that we might not always end up with $N_E$ extra delays, depending on the parameter choices.

Finally, if the path search launched in step 101 has not yet been completed, the process waits in step 110 for it to complete, before it returns to step 101 and repeats the steps described above.

Although a preferred embodiment of the present invention has been described and shown, the invention is not restricted to it, but may also be embodied in other ways within the scope of the subject-matter defined in the following claims.

The invention claimed is:

1. A method of receiving digital data symbols from at least two transmitters through a transmission channel of a communications network, in which individual multipath components of a transmitted data symbol are received with individual delays, and wherein received signals are processed by a RAKE unit having a number of fingers, the method comprising the step of providing a delay profile for each transmitter from a set of received pilot signals; said delay profile being generated from results of at least one path search and indicating a magnitude of received signal level for each of a first number of delay values, the method further comprising the steps of:
associating a counter with each of said transmitters;
incrementing the counter associated with a given transmitter by one each time a frame of digital data symbols has been received from the given transmitter, until the counter reaches a maximum counter value;
requesting a path search to be performed for the given transmitter, when the associated counter reaches a first pre-defined value;
listing path search requests in a first-in-first-out queue;
activating path searches in the order they are listed in the first-in-first-out queue; decreasing the counter associated with a transmitter by a second pre-defined value when a path search for that transmitter is activated; and
calculating by interpolation estimated magnitudes of received signal level for a second number of delay values located between at least some of said first number of delay values;
providing a combined delay profile by combining the magnitudes of received signal level for said first number of delay values and said second number of delay values;
determining delay values for peaks detected in said combined delay profile;
selecting a number of peak delay values among the peak delay values determined for said combined delay profile, said selected peak delay values comprising at least the delay value representing the largest peak detected in said combined delay profile; and
providing at least some of the selected peak delay values to the RAKE unit and assigning each provided peak delay value to a finger of the RAKE unit.

2. The method according to claim 1, wherein at least some of said first number of delay values are equidistantly spaced.

3. The method according to claim 2, wherein each of said second number of delay values is located half-way between two neighbouring ones of said first number of delay values.

4. The method according to claim 1, wherein said step of calculating estimated magnitudes for said second number of delay values is performed using polynomial interpolation.

5. The method according to claim 1, wherein said step of selecting a number of peak delay values comprises the steps of:
selecting the delay value representing the largest peak detected in said combined delay profile;
removing from consideration all delay values within a distance strictly less than a pre-defined minimal spacing of the delay value just selected; and
repeatedly selecting the delay value representing the largest peak detected among the remaining delay values and removing from consideration all delay values within a distance strictly less than a pre-defined minimal spacing of the delay value just selected, until a given number of delay values have been selected or all delay values of the combined delay profile have been selected or removed from consideration.

6. The method according to claim 1, wherein said step of selecting a number of peak delay values comprises the steps of:
pre-selecting all delay values of said combined delay profile representing magnitudes of received signal level higher than a pre-defined threshold;
selecting the delay value representing the largest peak among said pre-selected delay values;
removing from consideration the delay value just selected and delay values within a distance strictly less than two times a predefined minimal spacing of the delay value just selected, except for the delay values located said predefined minimal spacing from the delay value just selected;
repeatedly selecting, if a delay value located said predefined minimal spacing from the delay value previously selected belongs to said pre-selected delay values, this value and removing from consideration the delay value just selected and delay values within a distance strictly less than two times a predefined minimal spacing of the delay value just selected, except for the delay values located said predefined minimal spacing from the delay value just selected; and
repeating these steps for the remaining pre-selected delay values, until a given number of delay values have been selected or all pre-selected delay values have been selected or removed from consideration.

7. The method according to claim 1, further comprising the steps of:
generating from the peak delay values selected for each transmitter a combined set of peak delay values;
generating a reduced set of peak delay values by choosing a number of the largest peak delay values from the combined set of peak delay values;
generating a modified set of peak delay values by replacing, if no peak delay values from a given transmitter is contained in said reduced set of peak delay values and at least one peak delay value from said given transmitter represents a peak higher than a pre-defined threshold, the peak delay value of the weakest peak from said reduced set of peak delay values by the peak delay value of the largest peak from said given transmitter; and
providing the modified set of peak delay values to the RAKE unit and assigning each peak delay value of the modified set to a finger of the RAKE unit.

8. The method according to claim 1, wherein an activated path search for a transmitter provides a new search delay profile for that transmitter.

9. The method according to claim 8, further comprising the steps of:
extracting the delay values of a number of the largest peaks and their closest neighbour delay values of said new search delay profile for a transmitter; and
updating a previous delay profile provided for that transmitter by calculating for each delay value represented in the previous delay profile as well as in the extracted delay values an updated magnitude of received signal level for that delay value by adding to the previously calculated magnitude a percentage of the difference between the previously calculated magnitude and the corresponding magnitude from the new search delay profile, thereby obtaining an updated delay profile.

10. The method according to claim 9, wherein the percentage depends on the magnitude from the new search delay profile compared to the previously calculated magnitude.

11. The method according to claim 9, further comprising the steps of:
selecting the delay value representing the largest peak detected in said updated delay profile;
removing from consideration all delay values within a distance strictly less than a pre-defined minimal spacing of the delay value just selected;
repeatedly selecting the delay value representing the largest peak detected among the remaining delay values and removing from consideration all delay values within a distance strictly less than a pre-defined minimal spacing of the delay value just selected, until a given number of delay values have been selected or all delay values of the updated delay profile have been selected or removed from consideration; and
providing a monitored delay profile comprising the selected delay values and their closest neighbour delay values from said updated delay profile.

12. The method according to claim 11, further comprising the step of:
performing each time a pre-defined number of frames of digital data symbols have been received the steps of providing a combined delay profile and selecting a number of peak delay values among the peaks of the combined delay profile, wherein the monitored delay profile is used as the delay profile provided for a transmitter.

13. A receiver for digital data symbols from at least two transmitters through a transmission channel of a communications network, in which individual multipath components of a transmitted data symbol are received with individual delays, the receiver comprising a RAKE unit having a number of fingers for processing received signals, and the receiver being arranged to provide a delay profile for each transmitter from a set of received pilot signals; said delay profile being generated from results of at least one path search and indicating a magnitude of received signal level for each of a first number of delay values, wherein the receiver is further arranged to:
associate a counter with each of said transmitters;
increment the counter associated with a given transmitter by one each time a frame of digital data symbols has been received from the given transmitter, until the counter reaches a maximum counter value;
request a path search to be performed for the given transmitter, when the associated counter reaches a first pre-defined value;
list path search requests in a first-in-first-out queue;
activate path searches in the order they are listed in the first-in-first-out queue;
decrease the counter associated with a transmitter by a second pre-defined value when a path search for that transmitter is activated; and
calculate by interpolation estimated magnitudes of received signal level for a second number of delay values located between at least some of said first number of delay values;
provide a combined delay profile by combining the magnitudes of received signal level for said first number of delay values and said second number of delay values;
determine delay values for peaks detected in said combined delay profile;
select a number of peak delay values among the peak delay values determined for said combined delay profile, said selected peak delay values comprising at least the delay value representing the largest peak detected in said combined delay profile; and
provide at least some of the selected peak delay values to the RAKE unit and assign each provided peak delay value to a finger of the RAKE unit.

14. The receiver according to claim 13, wherein the receiver is arranged to provide the delay profile for a transmitter such that at least some of said first number of delay values are equidistantly spaced.

15. The receiver according to claim 14, wherein the receiver is arranged to locate each of said second number of delay values half-way between two neighbouring ones of said first number of delay values.

16. The receiver according to claim 13, wherein the receiver is arranged to calculate estimated magnitudes for said second number of delay values by using polynomial interpolation.

17. The receiver according to claim 13, wherein the receiver is arranged to select a number of peak delay values by being arranged to:
select the delay value representing the largest peak detected in said combined delay profile;
remove from consideration all delay values within a distance strictly less than a pre-defined minimal spacing of the delay value just selected; and
repeatedly select the delay value representing the largest peak detected among the remaining delay values and remove from consideration all delay values within a distance strictly less than a pre-defined minimal spacing of the delay value just selected, until a given number of delay values have been selected or all delay values of the combined delay profile have been selected or removed from consideration.

18. The receiver according to claim 13, wherein the receiver is arranged to select a number of peak delay values by being arranged to:
    pre-select all delay values of said combined delay profile representing magnitudes of received signal level higher than a pre-defined threshold;
    select the delay value representing the largest peak among said pre-selected delay values;
    remove from consideration the delay value just selected and delay values within a distance strictly less than two times a predefined minimal spacing of the delay value just selected, except for the delay values located said predefined minimal spacing from the delay value just selected;
    repeatedly select, if a delay value located said predefined minimal spacing from the delay value previously selected belongs to said pre-selected delay values, this value and remove from consideration the delay value just selected and delay values within a distance strictly less than two times a predefined minimal spacing of the delay value just selected, except for the delay values located said predefined minimal spacing from the delay value just selected; and
    repeat these steps for the remaining pre-selected delay values, until a given number of delay values have been selected or all pre-selected delay values have been selected or removed from consideration.

19. The receiver according to claim 13, wherein the receiver is further arranged to:
    generate from the peak delay values selected for each transmitter a combined set of peak delay values;
    generate a reduced set of peak delay values by choosing a number of the largest peak delay values from the combined set of peak delay values;
    generate a modified set of peak delay values by replacing, if no peak delay values from a given transmitter is contained in said reduced set of peak delay values and at least one peak delay value from said given transmitter represents a peak higher than a pre-defined threshold, the peak delay value of the weakest peak from said reduced set of peak delay values by the peak delay value of the largest peak from said given transmitter; and
    provide the modified set of peak delay values to the RAKE unit and assign each peak delay value of the modified set to a finger of the RAKE unit.

20. The receiver according to claim 13, wherein the receiver is arranged to provide in response to an activated path search for a transmitter a new search delay profile for that transmitter.

21. The receiver according to claim 20, wherein the receiver is further arranged to:
    extract the delay values of a number of the largest peaks and their closest neighbour delay values of said new search delay profile for a transmitter; and
    update a previous delay profile provided for that transmitter by calculating for each delay value represented in the previous delay profile as well as in the extracted delay values an updated magnitude of received signal level for that delay value by adding to the previously calculated magnitude a percentage of the difference between the previously calculated magnitude and the corresponding magnitude from the new search delay profile, thereby obtaining an updated delay profile.

22. The receiver according to claim 21, wherein the percentage depends on the magnitude from the new search delay profile compared to the previously calculated magnitude.

23. The receiver according to claim 21, wherein the receiver is further arranged to:
    select the delay value representing the largest peak detected in said updated delay profile;
    remove from consideration all delay values within a distance strictly less than a pre-defined minimal spacing of the delay value just selected;
    repeatedly select the delay value representing the largest peak detected among the remaining delay values and remove from consideration all delay values within a distance strictly less than a pre-defined minimal spacing of the delay value just selected, until a given number of delay values have been selected or all delay values of the updated delay profile have been selected or removed from consideration; and
    provide a monitored delay profile comprising the selected delay values and their closest neighbour delay values from said updated delay profile.

24. The receiver according to claim 23, wherein the receiver is further arranged to:
    provide a combined delay profile and select a number of peak delay values among the peaks of the combined delay profile each time a pre-defined number of frames of digital data symbols have been received; and
    use the monitored delay profile as the delay profile provided for a transmitter.

25. The receiver according to claim 13, wherein the receiver is a WCDMA receiver.

26. A non-transitory computer readable medium having stored thereon program code means for performing a method when said program code means is run on a computer, wherein the method is for receiving digital data symbols from at least two transmitters through a transmission channel of a communications network, in which individual multipath components of a transmitted data symbol are received with individual delays, and wherein received signals are processed by a RAKE unit having a number of fingers, said method comprising:
    providing a delay profile for each transmitter from a set of received pilot signals, said delay profile being generated from results of at least one path search and indicating a magnitude of received signal level for each of a first number of delay values;
    associating a counter with each of said transmitters;
    incrementing the counter associated with a given transmitter by one each time a frame of digital data symbols has been received from the given transmitter, until the counter reaches a maximum counter value;
    requesting a path search to be performed for the given transmitter, when the associated counter reaches a first pre-defined value;
    listing path search requests in a first-in-first-out queue;
    activating path searches in the order they are listed in the first-in-first-out queue;
    decreasing the counter associated with a transmitter by a second pre-defined value when a path search for that transmitter is activated; and
    calculating by interpolation estimated magnitudes of received signal level for a second number of delay values located between at least some of said first number of delay values;
    providing a combined delay profile by combining the magnitudes of received signal level for said first number of delay values and said second number of delay values;

determining delay values for peaks detected in said combined delay profile;

selecting a number of peak delay values among the peak delay values determined for said combined delay profile, said selected peak delay values comprising at least the delay value representing the largest peak detected in said combined delay profile; and providing at least some of the selected peak delay values to the RAKE unit and assigning each provided peak delay value to a finger of the RAKE unit.

* * * * *

UNITED STATES PATENT AND TRADEMARK OFFICE
CERTIFICATE OF CORRECTION

| | | |
|---|---|---|
| PATENT NO. | : 8,064,497 B2 | Page 1 of 1 |
| APPLICATION NO. | : 12/065508 | |
| DATED | : November 22, 2011 | |
| INVENTOR(S) | : Jonsson et al. | |

It is certified that error appears in the above-identified patent and that said Letters Patent is hereby corrected as shown below:

In Fig. 7, Sheet 5 of 8, delete "Prevoious set" and insert -- Previous set --, therefor.

In Column 9, Line 43, delete "4" and insert -- $t_4$ --, therefor.

In Column 12, Line 62, delete "$T_{delay\ selection}$)" and insert -- $T_{delay\ selection}$), --, therefor.

In Column 15, Line 64, delete "$N_{seleeted}$," and insert -- $N_{selected}$, --, therefor.

In Column 16, Line 36, delete "$\tau_c^{man,peak}$." and insert -- $\tau_c^{mon,peak}$. --, therefor.

In Column 16, Line 38, delete "$\tau_c^{man,peak}$" and insert -- $\tau_c^{mon,peak}$ --, therefor.

In Column 18, Line 14, delete "$\tau_{measurement}$" and insert -- $T_{measurement}$ --, therefor.

In Column 19, Line 36, delete "$t_{left}>t_{right}$" and insert -- $t_{left}>t_{right}$, --, therefor.

In Column 21, Line 15, delete "$\tau_{P1}$," and insert -- $\tau_{P2}$, --, therefor.

In Column 23, Line 3, delete "$\tau_{d1}^{prop}+\delta_1$," and insert -- $\tau_{d1}^{prop}-\delta_1$, --, therefor.

In Column 23, Line 18, delete "where rd," and insert -- , where --, therefor.

Signed and Sealed this
Twenty-first Day of February, 2012

David J. Kappos
*Director of the United States Patent and Trademark Office*